United States Patent [19]
Iwanaga et al.

[11] Patent Number: 6,057,906
[45] Date of Patent: May 2, 2000

[54] LIQUID CRYSTAL DISPLAY ELEMENT

[75] Inventors: Hiroki Iwanaga, Yokohama; Katsuyuki Naito, Tokyo, both of Japan

[73] Assignee: Kabushiki Kaisha Toshiba, Kawasaki, Japan

[21] Appl. No.: 08/825,179

[22] Filed: Mar. 27, 1997

[30] Foreign Application Priority Data

Mar. 29, 1996 [JP] Japan ................................ 8-075614
Sep. 6, 1996 [JP] Japan ................................ 8-236780

[51] Int. Cl.$^7$ .............................. G02F 1/13; C09K 19/00
[52] U.S. Cl. ........................................ 349/182; 252/299.1
[58] Field of Search ......................... 252/299.1; 349/182

[56] References Cited

U.S. PATENT DOCUMENTS

| | | | |
|---|---|---|---|
| 4,211,473 | 7/1980 | Shanks ................................ | 252/299.1 |
| 4,454,057 | 6/1984 | Kaneko et al. ...................... | 252/299.1 |
| 4,459,218 | 7/1984 | Yamada et al. ...................... | 252/299.1 |
| 4,838,659 | 6/1989 | Van Ewyk et al. .................. | 252/299.1 |
| 5,738,804 | 4/1998 | Cao et al. ........................... | 252/299.01 |

OTHER PUBLICATIONS

Uchida, "5.1–Invited 2 Color LCDs: Technological Developments," Department of Electronic Engineering, Faculty of Engineering, Tohoku University, Sendai, Japan Display, pp. 202–205, 1983.

Takashi Kato et al., "New Approach to Mesophase Stabilization through Hydrogen–Bonding Molecular Interactions in Binary Mixtures", J. Am. Chem. Soc., 111, pp. 8533–8534, 1989.

Takashi Kato et al., "Hydrogen–Bonded Ferroelectric Liquid–Crystalline Complexes based on a Chiral Benzoic Acid and Stillbazoles. Induction of Chiral Smectic C Phases by Molecular Self–Assembly", Ferroelectrics, vol. 148, pp. 161–167, 1993.

*Primary Examiner*—C H Kelly
*Attorney, Agent, or Firm*—Finnegan, Henderson, Farabow, Garrett & Dunner, L.L.P.

[57] ABSTRACT

A liquid crystal display device which comprises, a pair of substrates facing to each other and each provided with an electrode, the electrode provided on one of the substrates being faced to the electrode provided on the other substrate, and a liquid crystal layer sandwiched between the pair of substrates, wherein the liquid crystal layer contains as a main component a liquid crystal having a dichroic dye molecule dissolved therein, the dichroic dye molecule having at least one group selected from the group consisting of thiocarbonyl group, thioester group, dithioester group, selenocarbonyl group, selenoester group and diselenoester group. The liquid crystal layer may contain a first compound which is proton-donative and a second compound which is proton-acceptive which are dissolved therein, the first compound being linked via a hydrogen bonding with the second compound, and at least one of the first compound and the second compound exhibiting an absorption in the visible light range.

17 Claims, 7 Drawing Sheets

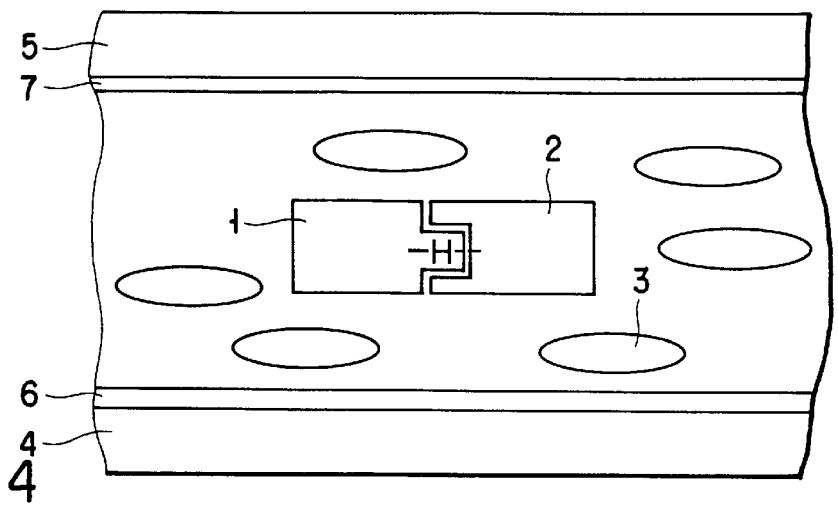
F I G. 4
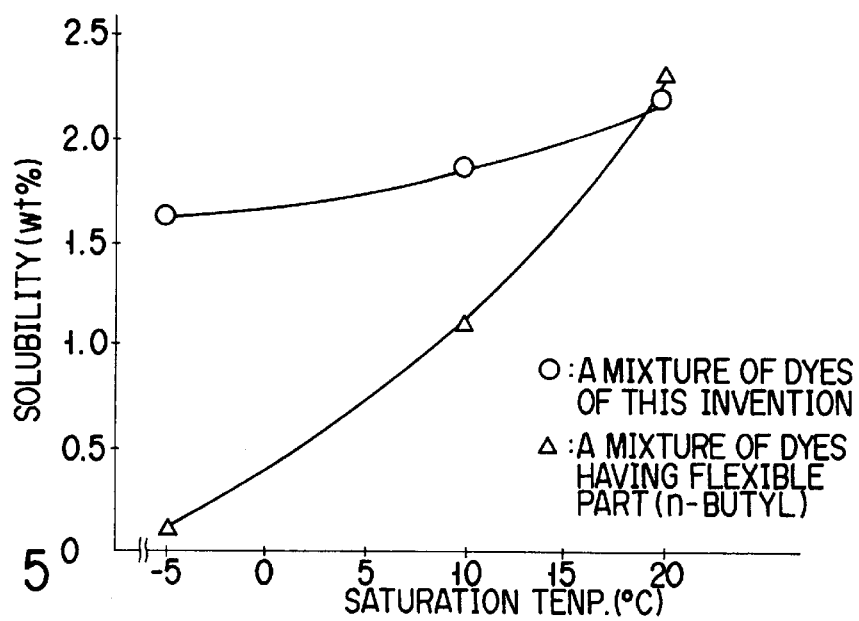
F I G. 5
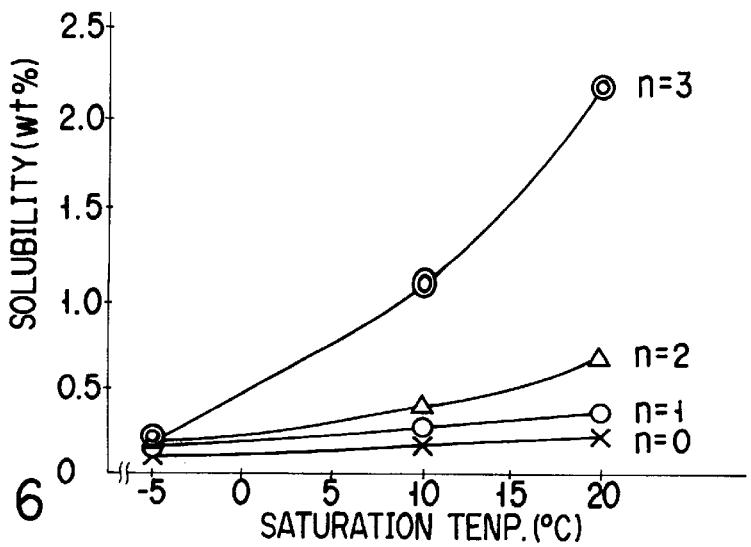
F I G. 6

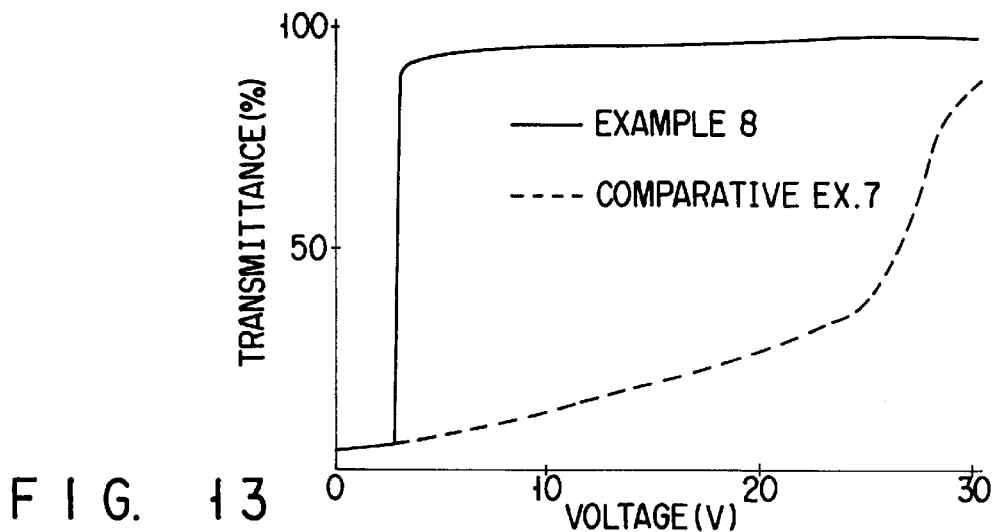
F I G. 13
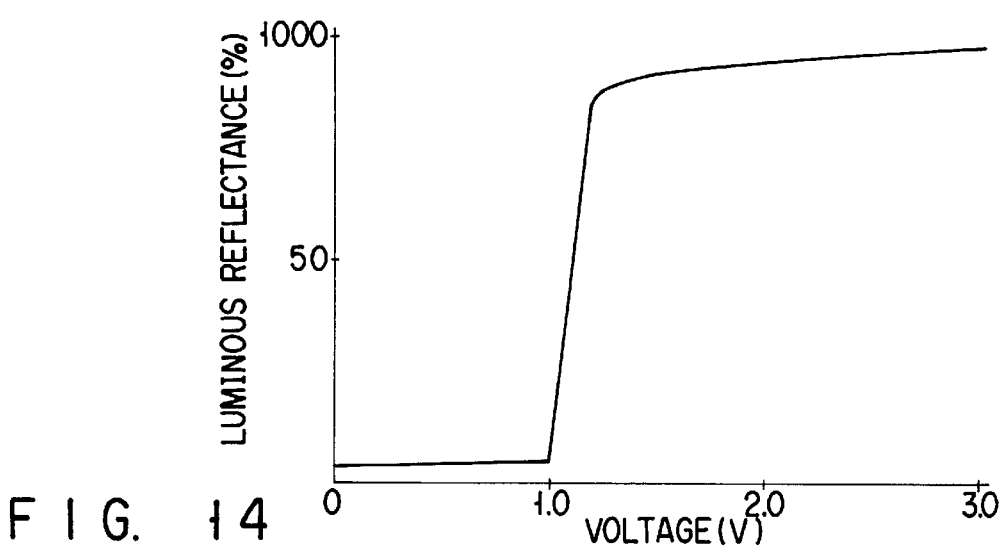
F I G. 14
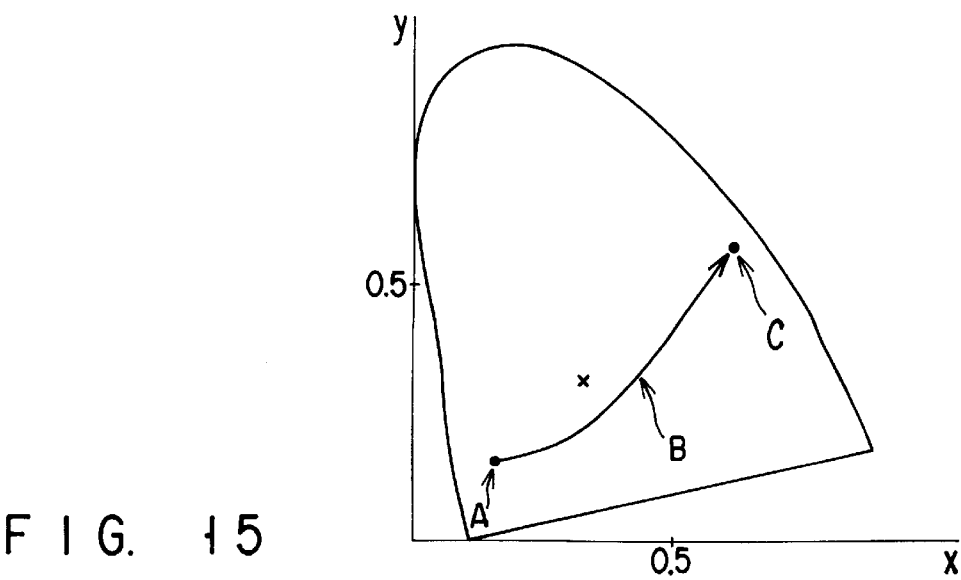
F I G. 15

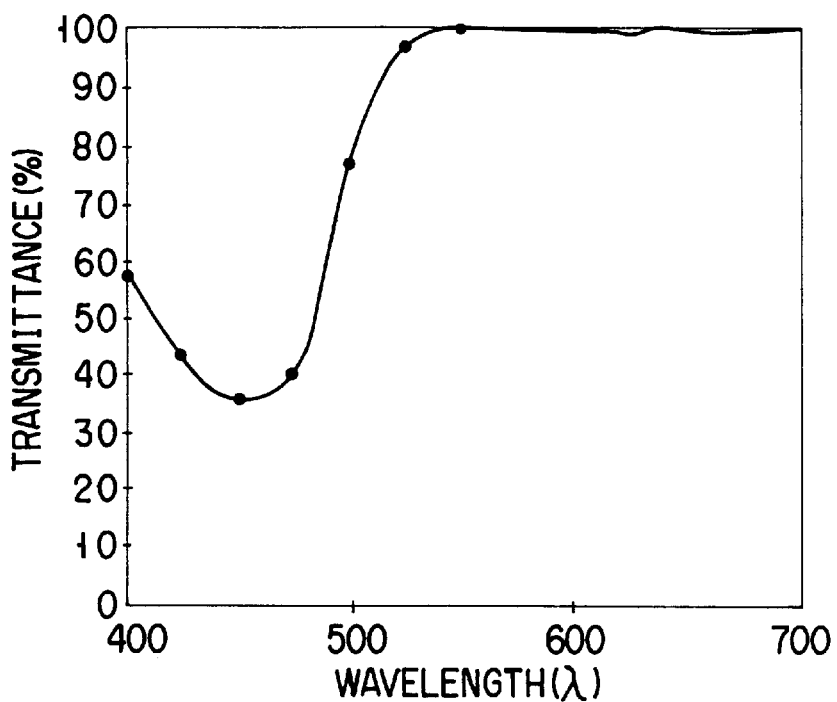
F I G. 16
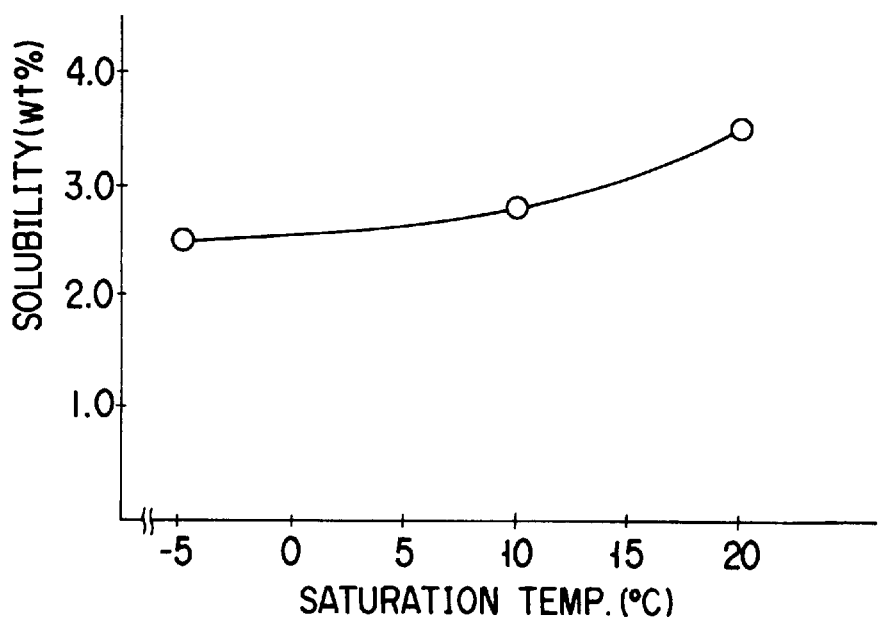
F I G. 17

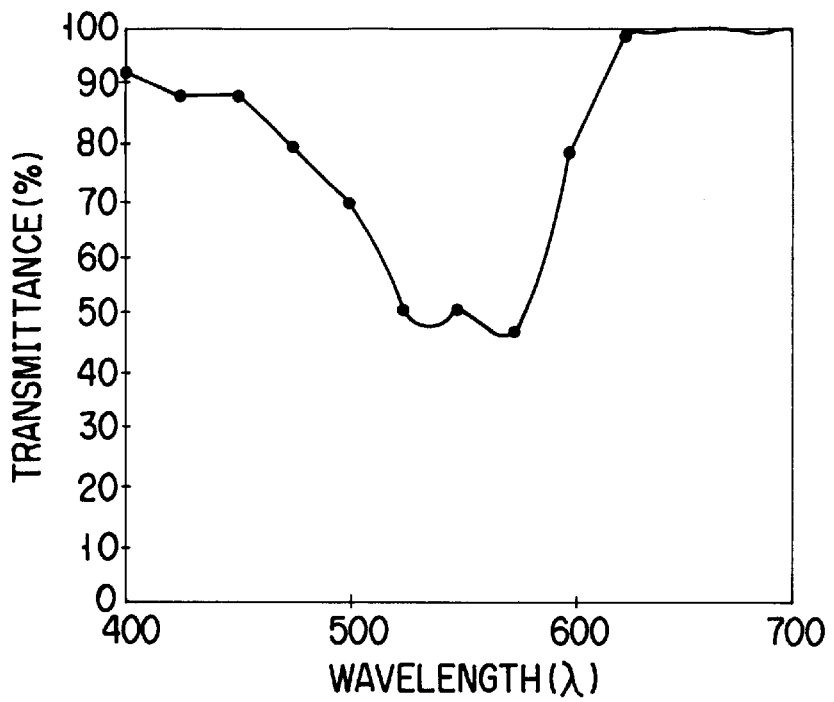
F I G. 18
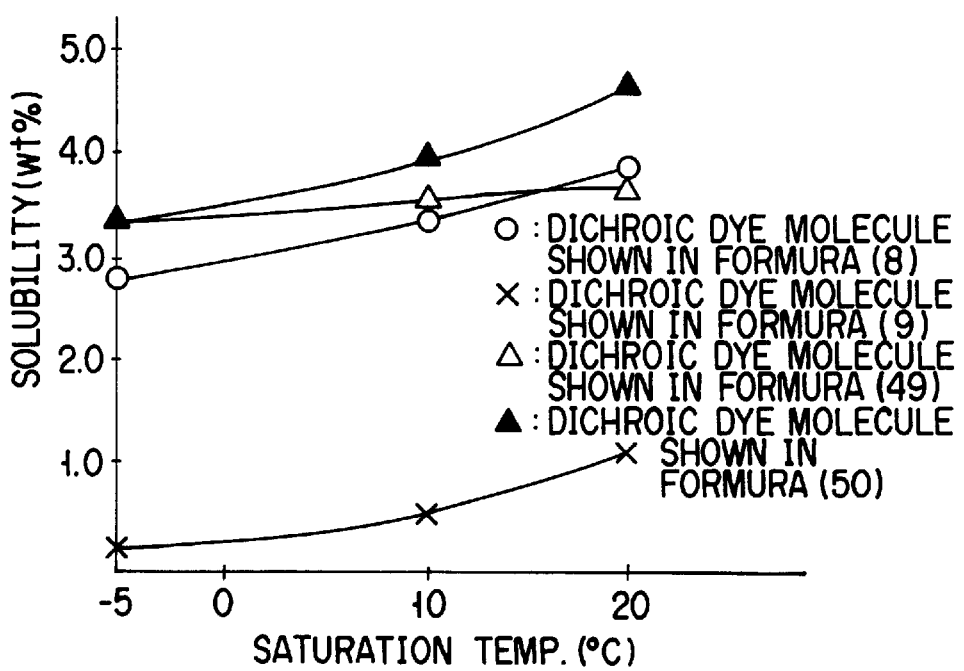
F I G. 19

LIQUID CRYSTAL DISPLAY ELEMENT

BACKGROUND OF THE INVENTION

This invention relates to a liquid crystal display device, and in particular to a liquid crystal display device of guest-host mode.

A liquid crystal display device of guest-host mode wherein a dye of high dichroic ratio is dissolved in a liquid crystal is relatively wide in visual angle, and, because of this advantage, is expected to be one of prospective display modes in future. To meet the demand for a color display device in recent years, the development for a color display device of guest-host mode has been also extensively undertaken.

As one example of such a color liquid crystal display device of guest-host mode, one wherein guest-host cells of three colors, i.e. yellow, cyan and magenta are superimposed one after another is known as suggested by T. Utida (Proc. 3rd. Display Res. Conf., p202, 1983).

In the liquid crystal display device of full color guest-host mode as mentioned above, it is requested for realizing a bright and clear color display that the spectrum of a dye therein indicates an ideal shape.

Further, the absorbancy of liquid crystal is required to be increased if a clear color is to be obtained, and, for the purpose of this, as much quantity of dye as possible must be dissolved into the liquid crystal. Accordingly, the solubility and dissolution stability of the dye to the liquid crystal are required to be improved. Furthermore, in order to enhance the contrast of display, it is necessary to improve the dichroic ratio as well as the degree of orientational order of the dye.

A terminal display device of portable type is required to be as minimal as possible in power consumption and hence as low as possible in driving voltage. If the driving voltage is to be lowered, it is important for the display device to have an electrooptical property exhibiting a low threshold voltage. This problem of lowering the threshold voltage of the display device is serious in particular for a liquid crystal microcapsule of guest-host mode where a dichroic dye is dissolved into a liquid crystal and the liquid crystal is microcapsulated. Namely, it is considered that in order to realize a clear color display, a voltage of as high as 20V to 50V is required.

As explained above, in order to realize a bright and clear color display in a display of guest-host mode, the solubility and dissolution stability of the dye to the liquid crystal are required to be sufficiently improved to such an extent that make it possible to realize such a high absorbancy of liquid crystal that is required to represent a clear color. If the concentration of dye is low, it would be impossible to obtain a sufficient color display. If the thickness of cell is increased to compensate this insufficient color display, it will not only invite an increase in power consumption, but also retard the response speed of color liquid crystal to an electric field.

With a view to improve the solubility of dye to a liquid crystal, there has been tried to employ a dye having a flexible substituent group such as a long chain alkyl group. The employment of such a dye is effective in some degree in improving the solubility of dye, but invites a problem that the solubility of the dye is highly dependent on temperature. For example, if such a dye exhibits a very small solubility at 5° C. as compared with the solubility thereof at 20° C., the dye would be precipitated at 5° C. even if the solubility of the dye at 20° C. is sufficiently high. Therefore, such a dye can hardly be employed as a display device.

A large number of dichroic dyes have been synthesized and studied for using them in a liquid crystal display device of guest-host mode, but none of them have been found satisfactory as yet in solubility and in dissolution stability under changes in temperature.

Meanwhile, in a liquid crystal display device of guest-host mode as mentioned above, if the concentration of dichroic dye in a liquid crystal is increased for obtaining a sufficient absorbency, it will invite a lowering in retention and an increase in viscosity of a color liquid crystal, thereby deteriorating the electrooptical property of the liquid crystal, thus resulting in a lowering of contrast and an increase in threshold voltage.

Furthermore, if the concentration of dichroic dye in a liquid crystal is increased, the dichroic ratio and the degree of orientational order will be also lowered, thus deteriorating the contrast of the liquid crystal.

BRIEF SUMMARY OF THE INVENTION

Accordingly, an object of the present invention is to provide a liquid crystal display device where a liquid crystal composition containing a dichroic dye excellent in solubility and dissolution stability to the liquid crystal is employed and which enables a bright and clear color display to be obtained.

Another object of this invention is to provide a liquid crystal display device where the rate of change in absorbency of liquid crystal containing a dichroic dye dissolved therein is enlarged in relative to an impressed voltage.

A further object of this invention is to provide a liquid crystal display device which is low in threshold voltage.

Namely, according to the present invention, there is provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains as a main component a liquid crystal having a dichroic dye molecule dissolved therein, the dichroic dye molecule having at least one group selected from the group consisting of thiocarbonyl group, thioester group, dithioester group, selenocarbonyl group, selenoester group and diselenoester group.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein a first compound which is proton-donative and a second compound which is proton-acceptive are dissolved in the liquid crystal layer; the first compound being linked via a hydrogen bonding with the second compound; and at least one of the first compound and the second compound exhibiting an absorption in the visible light range.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains as a main component a liquid crystal having two or more kinds of dichroic dye compound dissolved therein, a molecular structure of the dichroic dye compound being rigid entirely except a linkage portion between a basic skeleton and a substituent group thereof.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains as a main component a liquid crystal having a dichroic dye compound dissolved therein, a molecule of the dichroic dye compound having a plurality of asymmetric centers or asymmetric structures at least in its basic skeleton or substituent group.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains as a main component a liquid crystal having a dichroic dye compound dissolved therein, the dichroic dye compound having a plurality of asymmetric centers or asymmetric structures at least in its basic skeleton or substituent group and being constituted by only one type of enantiomorph thereof.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains as a main component a liquid crystal having two or more kinds of dichroic dye compound dissolved therein, a molecule of the dichroic dye compound having a plurality of asymmetric centers or asymmetric structures at least in its basic skeleton or substituent group, and being rigid entirely except a linkage portion between a basic skeleton and a substituent group thereof.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains as a main component a liquid crystal having two or more kinds of dichroic dye compound dissolved therein, a molecule of the dichroic dye compound having a plurality of asymmetric centers or asymmetric structures at least in its basic skeleton or substituent group, being rigid entirely except a linkage portion between a basic skeleton and a substituent group thereof, and being constituted by only one type of enantiomorph thereof.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains as a main component a liquid crystal having two or more kinds of dichroic dye compound dissolved therein, a molecular structure of the dichroic dye compound being rigid entirely except a linkage portion between a basic skeleton and a substituent group thereof, and having at least one group selected from the group consisting of thiocarbonyl group, thioester group, dithioester group, selenocarbonyl group, selenoester group and diselenoester group.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains as a main component a liquid crystal having two or more kinds of dichroic dye molecule dissolved therein, the dichroic dye molecule having at least one group selected from the group consisting of thiocarbonyl group, thioester group, dithioester group, selenocarbonyl group, selenoester group and diselenoester group, having a plurality of asymmetric centers or asymmetric structures at least in its basic skeleton or substituent group, and being rigid entirely except a linkage portion between the basic skeleton and the substituent group thereof.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains as a main component a liquid crystal having a dichroic dye molecule dissolved therein, the dichroic dye molecule having at least one group selected from the group consisting of thiocarbonyl group, thioester group, dithioester group, selenocarbonyl group, selenoester group and diselenoester group, having a plurality of asymmetric centers or asymmetric structures at least in its basic skeleton or substituent group, and being constituted by only one type of enantiomorph thereof.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains as a main component a liquid crystal having a dichroic dye molecule dissolved therein, the dichroic dye molecule having a tolan (diphenyl acetylene) moiety or a difluorostilbene moiety as a substituent group which is linked to a basic skeleton thereof.

According to the present invention, there is further provided a liquid crystal display device which comprises; a pair of substrates facing to each other and each provided with an electrode, the electrode provided on one of the substrates being faced to the electrode provided on the other substrate; and a liquid crystal layer sandwiched between the pair of substrates; wherein the liquid crystal layer contains a dichroic dye molecule having a tolan (diphenyl acetylene) moiety or a difluorostilbene moiety as a substituent group which is linked to a basic skeleton thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a cross-sectional view of a liquid crystal display device according to a second embodiment of this invention;

FIG. 5 is a graph showing a relationship between the saturation temperature and solubility of a dichroic dye mixture to a liquid crystal;

FIG. 6 is a graph showing relationships among the number of carbon atom of the linear alkyl group, the solubility and the temperature dependency of a dichroic dye mixture;

FIG. 13 is a graph showing an electrooptical properties of a liquid crystal display device of Example 8 and of Comparative Example 7;

FIG. 14 is a graph showing an electrooptical properties of a liquid crystal display device of Example 9;

FIG. 15 is a graph illustrating changes in hue of a liquid crystal display device of Example 10;

FIG. 16 is a graph showing a spectral transmittance of a dichroic dye mixture of Example 11;

FIG. 17 is a graph showing a relationship between the saturation temperature and solubility of a dichroic dye mixture of Example 12;

FIG. 18 is a graph showing a spectral transmittance of a dichroic dye mixture of Example 12; and FIG. 19 is a graph showing a relationship between the saturation temperature and solubility of a dichroic dye mixture of Example 18 and of Example 19.

DETAILED DESCRIPTION OF THE INVENTION

This invention will be further explained in detail as follows.

A first embodiment of this invention is featured in that a dichroic dye molecule having a group selected from the group consisting of thiocarbonyl group, thioester group, dithioester group, selenocarbonyl group, selenoester group and diselenoester group is employed as a dichroic dye compound to be dissolved in a liquid crystal material.

Preferably, this dichroic dye molecule comprises a skeleton selected from the following general formulas (1) to (7).

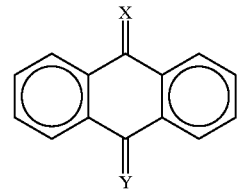

(1)

(wherein X and Y represent individually O, S or Se, with the proviso that X and Y cannot concurrently be O)

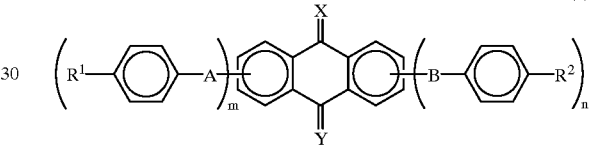

(2)

(wherein X and Y represent individually O, S or Se, with the proviso that X and Y cannot concurrently be O; $R^1$ and $R^2$ are individually H, alkyl group or cycloalkyl group; A and B are individually S or NH; and both n and m are an integer of 0 to 4)

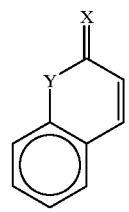

(3)

(wherein X represents O, S or Se; and Y is O, S, or Se, with the proviso that X and Y cannot concurrently be O)

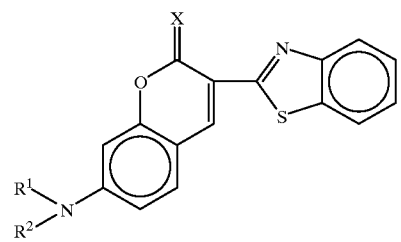

(4)

(wherein X is S or Se; and $R^1$ and $R^2$ are individually H or alkyl group)

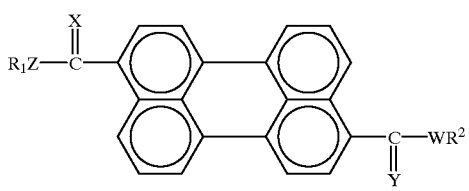

(5)

(wherein X, Y, Z and W represent individually O, S or Se, with the proviso that X, Y, Z and W cannot concurrently be O; $R^1$ and $R^2$ are individually alkyl group, phenyl group, cycloalkyl group or a substituted group of them)

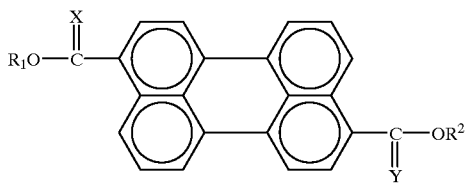

(6)

(wherein X and Y represent individually O, S or Se, with the proviso that X and Y cannot concurrently be O; and $R^1$ and $R^2$ are individually alkyl group, phenyl group, cycloalkyl group or a substituted group of them)

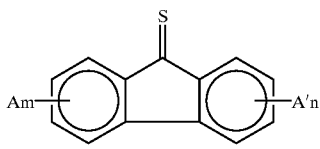

(7)

(wherein A and A' represent individually ester group, thioester group, dithioester group, aminophenyl group, amino group or nitro group; and both m and n are an integer of 0 to 4)

The inventors have found the fact that if the oxygen atom of carbonyl group or ester group of dichroic dye molecule is substituted by sulfur atom or selenium atom, the solubility to a liquid crystal of the dichroic dye as well as the dissolution stability to a temperature change of the dichroic dye can be prominently improved, and, on the basis of this finding, have accomplished this invention. Namely, the dichroic dye molecule according to the first embodiment of this invention is featured in that the oxygen atom of carbonyl group of anthraquinone dye is substituted by a sulfur atom as shown in the following general formula (8).

Figure 1:
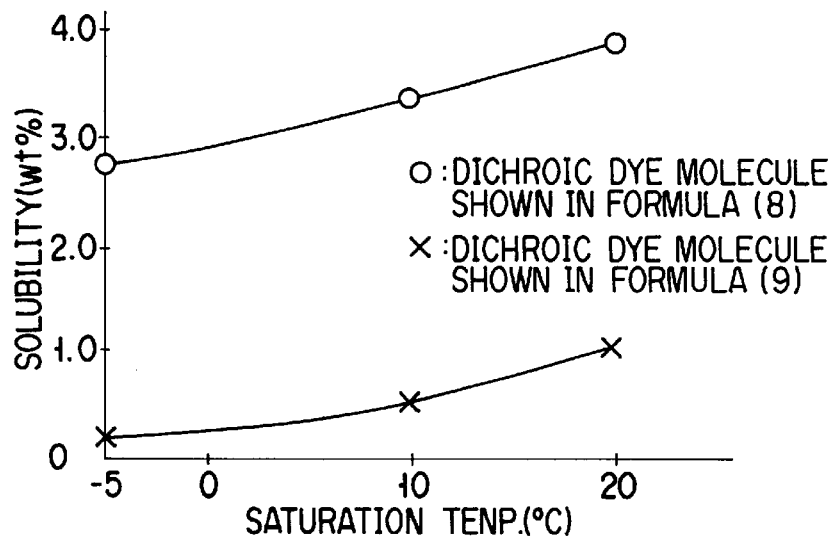
FIG. 1 is a graph showing a relationship between the saturation temperature and solubility of a dichroic dye mixture of Example 1 and of Comparative Example 1.

FIG. 1 shows a graph illustrating a comparison with respect to the solubility and dissolution stability to a liquid crystal between the dichroic dye molecule shown in the following general formula (8) and the dichroic dye molecule shown in the following general formula (9) where the oxygen atom thereof is not substituted by sulfur atom.

(8)

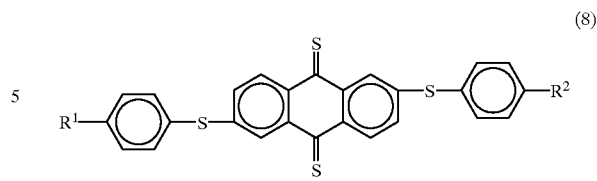

(9)

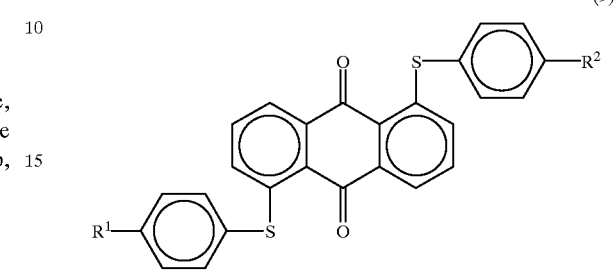

(wherein $R^1$ and $R^2$ are individually ethyl or n-butyl)

It will be clear from FIG. 1, the dichroic dye molecule according to this invention is superior in solubility and dissolution stability as compared with the dichroic dye molecule where oxygen atom thereof is not substituted by sulfur atom.

Figure 2:
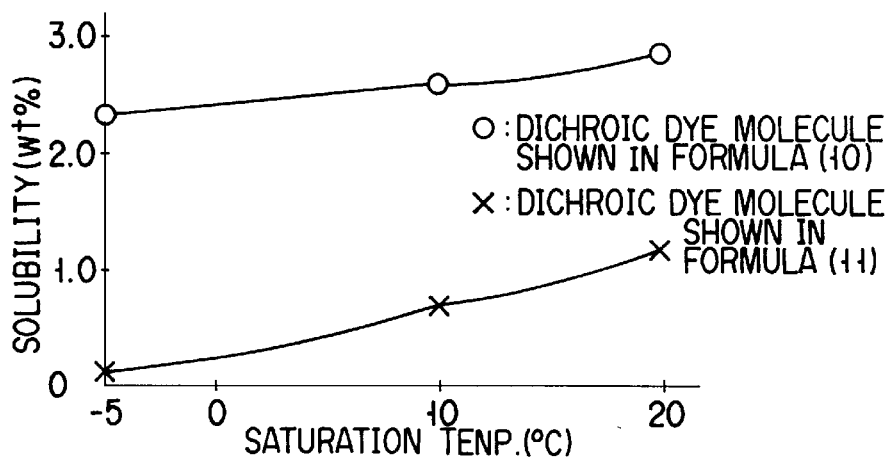
FIG. 2 is a graph showing a relationship between the saturation temperature and solubility of a dichroic dye mixture of Example 2 and of Comparative Example 2.

The dichroic dye molecule according to a first embodiment of this invention may be a substituted coumarin dye as shown in the following general formula (10) where the oxygen atom in the carbonyl group is substituted by sulfur atom. FIG. 2 shows a graph illustrating a comparison with respect to the solubility and dissolution stability to a liquid crystal between the dichroic dye molecule shown in the following general formula (10) and the dichroic dye molecule shown in the following general formula (11) where the oxygen atom thereof is not substituted by sulfur atom.

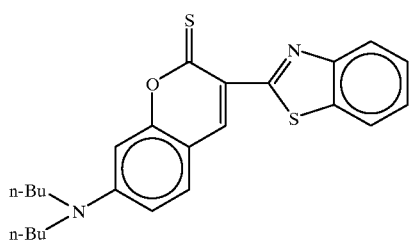

(10)

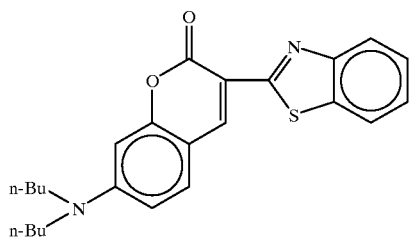

(11)

It will be clear from FIG. 2, the dichroic dye molecule according to this invention is far superior in solubility and dissolution stability as compared with the dichroic dye molecule where oxygen atom thereof is not substituted by sulfur atom.

Figure 3:
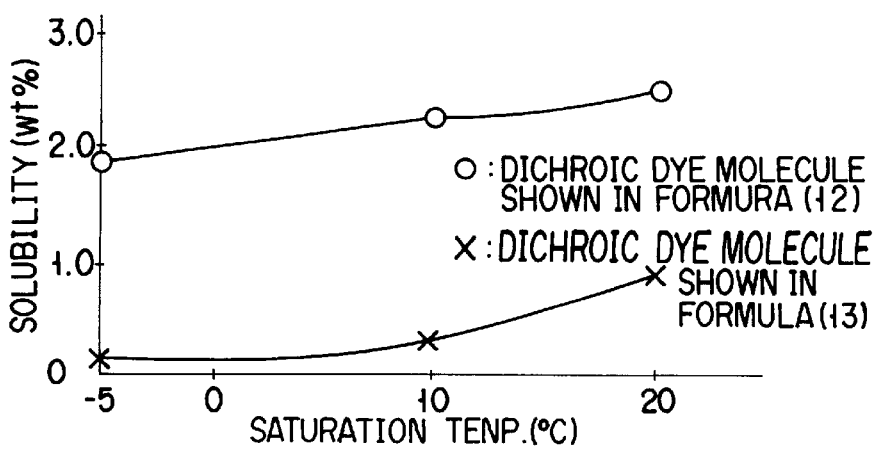
FIG. 3 is a graph showing a relationship between the saturation temperature and solubility of a dichroic dye mixture of Example 3 and of Comparative Example 3.

Further, the dichroic dye molecule according to the first embodiment of this invention may be a substituted perylene dye as shown in the following general formula (12) where the oxygen atom in the carbonyl group is substituted by sulfur atom. FIG. 3 shows a graph illustrating a comparison with respect to the solubility and dissolution stability to a liquid crystal between the dichroic dye molecule shown in the following general formula (12) and the dichroic dye molecule shown in the following general formula (13) where the oxygen atom thereof is not substituted by sulfur atom.

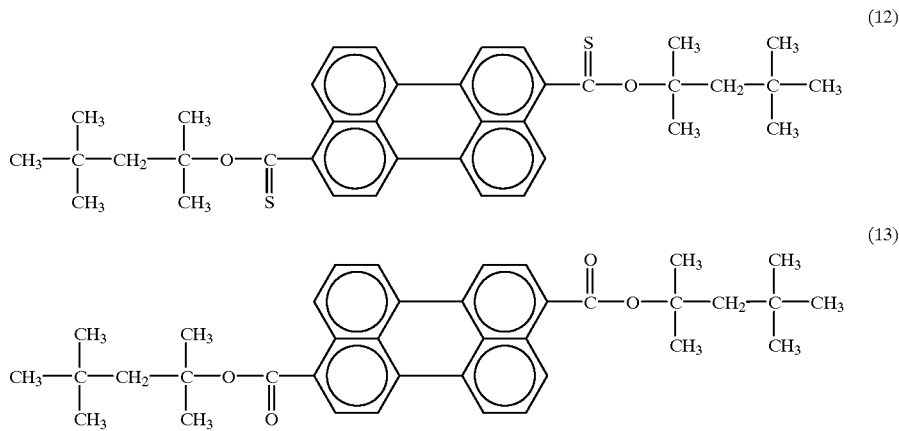

It will be clear from FIG. 3 that the dichroic dye molecule according to this invention is far superior in solubility and dissolution stability as compared with the dichroic dye molecule where oxygen atom thereof is not substituted by sulfur atom.

Furthermore, a color liquid crystal employing a dichroic dye compound according to the first embodiment of this invention is higher in electric resistance as compared with the conventional color liquid crystal, and hence suited for use in a TFT driving. In particular, when a dichroic dye compound according to the first embodiment of this invention is employed for a fluorine liquid crystal, an excellent result will be obtained.

Other examples of the dichroic dye according to the first embodiment of this invention can be summarized in the following general formulas (14) to (22).

Anthraquinone dye:

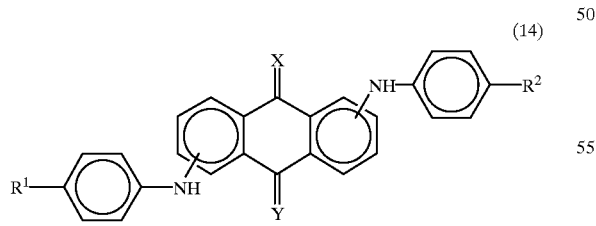

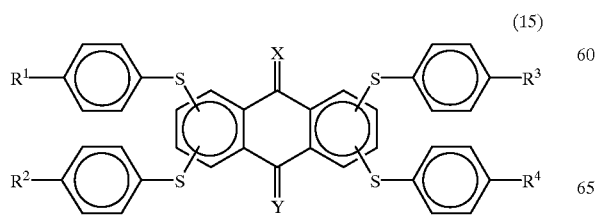

-continued

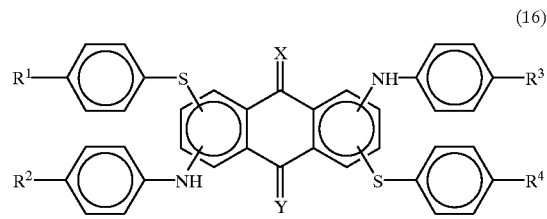

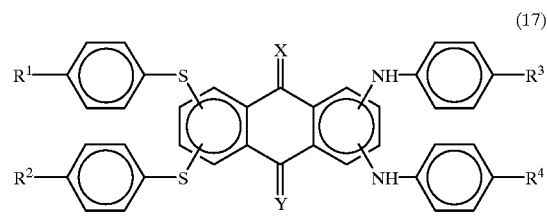

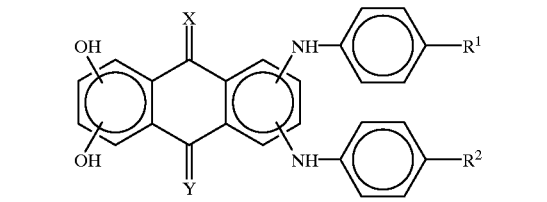

(wherein $R^1$, $R^2$, $R^3$ and $R^4$ are individually hydrogen atom or alkyl group; and X and Y represent individually O, S or Se, with the proviso that X and Y cannot concurrently be O)

Coumarin dye:

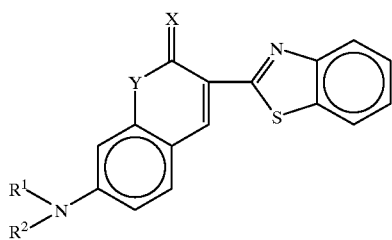

(20)

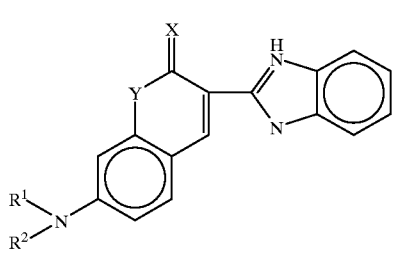

(21)

(wherein $R^1$ and $R^2$ are individually hydrogen atom or alkyl group; X is O, S or Se; and Y is O, S or Se, with the proviso that X and Y cannot concurrently be O)

Perylene dye:

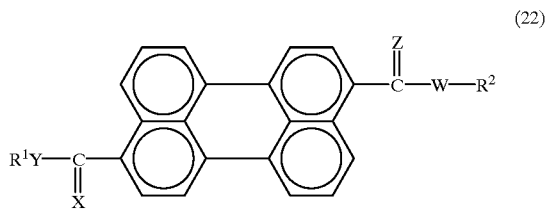

(22)

(wherein $R^1$ and $R^2$ are individually hydrogen atom or alkyl group; X, Y, Z, and W represent individually O, S or Se, with the proviso that X, Y, Z, and W cannot all be O)

As explained above, according to a first embodiment of this invention, the oxygen atom of carbonyl group or the oxygen atom of ester group of a dichroic dye such as anthraquinone dye, coumarin dye or perylene dye is substituted by sulfur atom or selenium atom. Since these sulfur atom and selenium atom are electronically soft as compared with oxygen atom, of the dye molecule is promoted and the substitution of these sulfur atom and selenium atom for the oxygen atom contributes to an increase in solubility of the dye to a liquid crystal exhibiting a hydrophobic environment.

Since these thiocarbonyl group and selenocarbonyl group of selenium-substituted dichroic dye are low in affinity to an ionic compound as compared with carbonyl group, there is less possibility of a color liquid crystal being contaminated with an ionic impurity. As a result, the electric resistance of the color liquid crystal will be increased, thus making it suited for use in a TFT driving.

The liquid crystal according to the second embodiment of this present invention is featured in that a first compound which is proton-donative and a second compound which is proton-acceptive are dissolved in the liquid crystal, that the first compound is linked via a hydrogen bonding with the second compound, and that at least one of the first compound and the second compound exhibits an absorption in the visible light range.

It has been found by the present inventors that when a proton-donative compound and a proton-acceptive compound, at least one of which being selected to be a dye molecule exhibiting an absorption in the visible light range, are dissolved in a liquid crystal so as to link them together via a hydrogen, it is possible to keep a sufficient quantity of dye molecule dissolved stably in the liquid crystal for a long period of time, thereby making it possible to lower the threshold voltage, to accelerate the response and to improve the dichroic ratio and the degree of orientational order of the dye molecule.

The liquid crystal display device according to a second embodiment of this invention is constructed as shown in FIG. 4 that a liquid crystal 3 containing a proton-donative compound 1 (hydrogen bond donor) and a proton-acceptive compound 2 (hydrogen bond acceptor) dissolved therein is sandwiched between substrates 4 and 5 provided with electrodes 6 and 7 respectively.

As shown in FIG. 4, the proton-donative compound 1 and the proton-acceptive compound 2 are linked together via a hydrogen bonding. At this occasion, at least one of these compounds 1 and 2 is selected as being a dye molecule. When the dye molecule is linked linearly with another compound in this manner, the apparent molecular structure thereof becomes similar to that of liquid crystal molecule. Namely, the solubility as well as dissolution stability of the dye molecule are prominently enhanced by taking, through a hydrogen bonding, a molecular structure similar to that of a liquid crystal molecule as compared with when the dye is dissolved singly in a liquid crystal.

It is also possible to further improve the solubility of the dye by making the molecular structure of the other one (not constituting as a dye) selected from the hydrogen bond donor and the hydrogen bond acceptor into a liquid crystal structure. The reason is that, when a dye selected from the hydrogen bond donor and the hydrogen bond acceptor is assumed as being a solute and the other as being one of solvents, the dye and a portion of solvent are linked through a hydrogen bonding, thus effecting a strong interaction between the dye and the solvent.

Although there is any particular limitation, it is preferable in view of forming a stable hydrogen bonding to employ a compound having a carboxylic group as the hydrogen bond donor and to employ a pyridine compound as the hydrogen bond acceptor. In this case, the pyridine compound should preferably be selected from those having an electron donative substituent group in order to enhance the proton-accepting property thereof.

When a compound having a carboxylic group is selected as the hydrogen bond donor, the electric resistance of the resultant liquid crystal layer may happen to be lowered. However, it is possible to attain a high electric resistance even in such a case as mentioned above, by adding the hydrogen bond acceptor to the hydrogen bond donor in an amount exceeding over one equivalent weight per mol of the hydrogen bond donor.

It is possible according to this invention to constitute both proton-donative compound (hydrogen bond donor) and proton-acceptive compound (hydrogen bond acceptor) with a dye respectively so as to make them into a black dichroic dye as a whole. According to the conventional method, a black liquid display device of guest-host mode is formed with a mixture of three dyes of different colors, i.e. yellow, cyan and magenta, which is dissolved into a liquid crystal. However, according to the conventional method, since these different coloring dyes are co-existed in a liquid crystal, they are frequently interacted with each other whereby deteriorating the light stability of these dyes.

By contrast, according to this invention, since the dye molecules constituting complementary colors one another are linked together via a hydrogen bonding, the interaction between these different dye molecules would hardly take place, thereby making it possible to prominently improve the light stability of these dyes as compared with the conventional method where a plurality of different color dyes are simply mixed together.

It is also possible according to this invention to constitute both proton-donative compound (hydrogen bond donor) and proton-acceptive compound (hydrogen bond acceptor) respectively with a dye differing in hue from each other so as to allow them to change in hue as a whole in accordance with a magnitude of voltage applied thereto. Namely, one of the proton-donative compound (hydrogen bond donor) and the proton-acceptive compound (hydrogen bond acceptor) is constituted with a P-type dichroic dye which is adapted to exhibit a rise of its longer axis in conformity with the impressing direction of voltage, while the other is constituted with an N-type dichroic dye which is adapted to exhibit a rise of its shorter axis in conformity with the impressing direction of voltage, these P-type and N-type dichroic dyes being linearly linked together via a hydrogen bonding, thereby making it possible to display either one of hues of these dyes or an intermediate hue of these dyes with only one kind of liquid crystal layer.

The same function of the liquid crystal layer as mentioned above may be obtained also by constituting both of the proton-donative compound (hydrogen bond donor) and the proton-acceptive compound (hydrogen bond acceptor) respectively with a P-type dichroic dye which is adapted to exhibit a rise of its longer axis in conformity with the impressing direction of voltage, or respectively with an N-type dichroic dye which is adapted to exhibit a rise of its shorter axis in conformity with the impressing direction of voltage, and by linking these P-type and N-type dichroic dyes via a hydrogen bonding in such a manner that the axis of one of these molecules is disposed perpendicular to the axis of the other one.

Further, according to this second embodiment of this invention, it is possible to obtain a liquid crystalline property only with the proton-donative compound (hydrogen bond donor) and the proton-acceptive compound (hydrogen bond acceptor) by linking them together via a hydrogen bonding. Since at least one of these compounds is constituted with a dye exhibiting an absorption in the visible light range, the resultant liquid crystal is capable of acting as a dichroic dye. Therefore, the restriction of solubility of a dye to a liquid crystal which has been conventionally considered as one of most important problems can be overcome, so that the dye can be incorporated in any desired ratio.

Furthermore, according to this second embodiment of this invention, since a dye molecule can be optionally incorporated into a proton-donative compound or a proton-acceptive compound, the concentration of dye can be optionally selected from a wide range of concentration. Since the concentration of dye in a liquid crystal can be enlarged in this case, the thickness of cell which is required for obtaining a predetermined absorbancy can be minimized, the power consumption of the cell can be reduced.

It is possible according to the second embodiment of this invention to adjust the physical property of liquid crystal by suitably mixing the aforementioned dichroic dye liquid crystal with other kinds of liquid crystal. In this case also, there is no restriction relevant to the solubility of the dye.

According to the second embodiment of this invention, the dye molecule to be employed is not required to be completely synthesized, but a dye molecule having a specific skeleton or a substituent group can be simply mixed with a liquid crystal. Accordingly, the manufacture of a display device can be simplified with a reduced manufacturing cost and without any particular restriction on the synthesis of the dye.

Examples of liquid crystal useful in this second embodiment of this invention include, among others, TC-4368XX, ZL-4281/2, ZLI-3889, ZLI-500-000, MLC-6041-000, ZLI-4620, ZLI-5100-000, ZLI-1840, ZLI-2116 and ZLI-2293, each available from Merk Japan Co.; LIXON4033-000XX, LIXON4034-000XX and LIXON-5052, each available from Chisso Kagaku Kogyo Co.

According to the second embodiment of this invention, both proton-donative compound and proton-acceptive compound are dissolved in a liquid crystal layer so as to link these compounds together via a hydrogen, thereby making it possible to improve the solubility to the liquid crystal of a dichroic dye constituted by the proton-donative compound or the proton-acceptive compound.

According to the second embodiment of this invention, since the hydrogen bonding is a flexible bonding, the viscosity of a liquid crystal can be greatly lowered and at the same time the threshold voltage can be lowered. In this case, the effect of the reduction in threshold voltage would be exhibited most prominently when the liquid crystal is a liquid crystal microcapsule.

A liquid crystal display device according to the third embodiment of this invention is featured in that it comprises, as a dichroic dye to be dissolved into a liquid crystal, two or more kinds of dichroic dye compound are employed, a molecular structure of each dichroic dye compound being rigid entirely except a linkage portion between a basic skeleton and a substituent group thereof.

Preferably, the molecule of all of the dichroic dyes does not contain, excluding a linkage portion between a basic skeleton and a substituent group thereof, a portion where atoms each having any other substituent group than hydrogen atom are linearly connected with each other in four or more sequence.

One example of the aforementioned dichroic dye molecule has a structure represented by the following general formula (23).

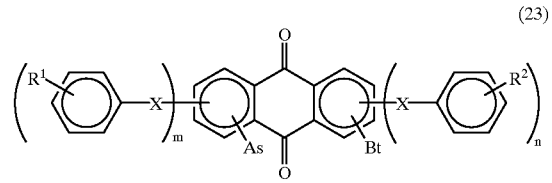

(wherein X is O, S, Se, $NH_2$ or —$CH_2$—; $R^1$ and $R^2$ are individually H, alkyl group or cycloalkyl group; A and B are individually amino group, nitro group or hydroxyl group; and m, n, s and t are an integer of 0 to 4 with a proviso that all of m, n, s and t cannot be concurrently 0)

The inventors have found the fact that if the molecule of all of dichroic dyes in a color liquid crystal comprising two or more kinds of dichroic dyes is entirely rigid except a linkage portion between a basic skeleton and a substituent group thereof, the dissolution stability to a temperature change of the dichroic dye can be prominently improved, and, on the basis of this finding, have accomplished this invention.

Namely, the dichroic dye mixture according to the third embodiment of this invention is constructed entirely of rigid portions except a linkage portion (which is flexible) between a basic skeleton and a substituent group thereof as shown for example in the following general formula (24).

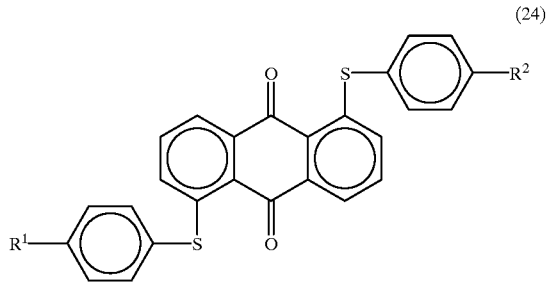

(24)

(wherein $R^1$ and $R^2$ are individually H or a rigid alkyl group)

FIG. 5 shows a graph illustrating a relationship between the temperature and solubility of a dichroic dye mixture (the general formula (24)) according to the third embodiment of this invention and of a dye compound having a flexible substituent (n-butyl). It will be clear from FIG. 5 that the dichroic dye molecule according to the third embodiment of this invention is far small in temperature dependency as compared with the dichroic dye molecule having a flexible substituent group such as n-butyl. This phenomenon can be ascribed to the fact that the conventional dichroic dye having a flexible substituent is large in magnitude of change in entropy, whereas the dichroic dye mixture according to this invention is small in magnitude of change in entropy.

FIG. 6 shows a graph illustrating the temperature dependency of the solubility of the compound represented by the following general formula (25) as the chain length of the alkyl group of the compound is changed. It will be clear from FIG. 6 that the solubility can be increased in general as the chain length of alkyl group is enlarged, but when the number of carbon atom of the alkyl group is increased to four or more, the temperature dependency of the solubility is abruptly increased.

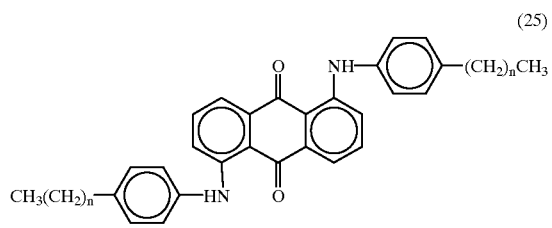

(25)

(wherein n is 0, 1, 2 or 3)

As explained above, according to the third embodiment of this invention, since the dichroic dye mixture to be dissolved in a liquid crystal material is constituted only with dichroic dyes which are entirely rigid except a linkage portion between a basic skeleton and a substituent group thereof, the temperature dependency of solubility of the dyes can be prominently reduced. As a result, it is possible to prevent the precipitation of the dyes that might be brought about when a display of guest-host mode is exposed to a low temperature.

A liquid crystal display device according to a fourth embodiment of this invention is featured in that it employs a dichroic dye compound having a plurality of asymmetric centers or asymmetric structures at least in its basic skeleton or substituent group of its molecule; or in that it employs a dichroic dye compound having a plurality of asymmetric centers or asymmetric structures at least in its basic skeleton or substituent group and being constituted by only one type of enantiomorph thereof.

It has been found by the inventors that when a plurality of asymmetric sources are introduced into the molecule of dichroic dye so as to produce a mixture of diastereomers, or when this mixture of diastereomers or a diastereomer having one asymmetric source is optically resolved so as to obtain only one type of enantiomorph thereof, the solubility of the dichroic dye can be prominently improved, and, on the basis of this finding, have accomplished this invention.

Examples of such a dichroic dye molecule are those represented by the following general formulas (26), (27), (28) and a mixture of them.

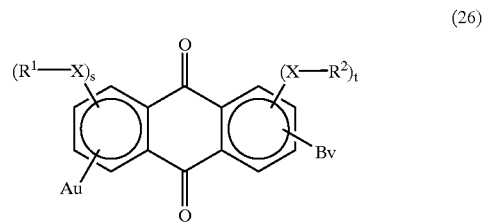

(26)

(wherein X is O, S, Se, $NH_2$ or $-CH_2-$; $R^1$ and $R^2$ are individually alkyl group, cycloalkyl group, acyl group, phenyl group, biphenyl group, cyclohexylphenyl group or dicyclohexyl group, each of these groups having at least one kind of asymmetric center or asymmetric structure; A and B are individually amino group or hydroxyl group; s and t are an integer of 0 to 4; and u and v are an integer of 0 to 3 with a proviso that $s+t \geq 2$; $s+u \leq 4$; and $t+v \leq 4$)

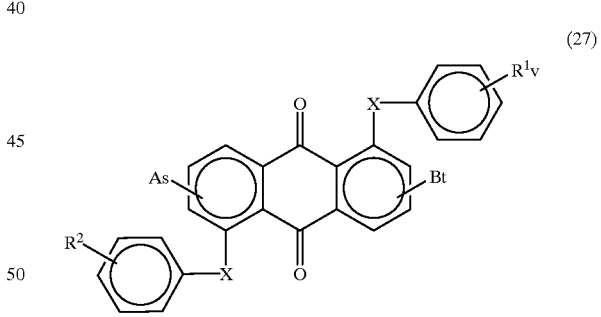

(27)

(wherein X is S, $NH_2$ or $-CH_2-$; $R^1$ and $R^2$ are individually alkyl group, cycloalkyl group, acyl group, a substituted phenyl group, a substituted biphenyl group, a substituted cyclohexylphenyl group or a substituted dicyclohexyl group, each of these groups having at least one kind of asymmetric center or asymmetric structure; A and B are individually amino group or hydroxyl group; s and t are an integer of 0 to 3; and u and v are an integer of 0 to 5 with a proviso that $u+v \geq 2$)

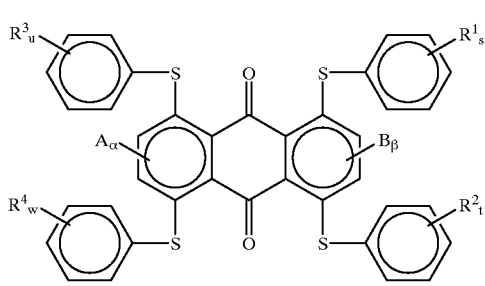

(28)

(wherein $R^1$, $R^2$, $R^3$ and $R^4$ are individually alkyl group, cycloalkyl group, acyl group, a substituted phenyl group, a substituted biphenyl group, a substituted cyclohexylphenyl group or a substituted dicyclohexyl group, each of these groups having at least one kind of asymmetric center or asymmetric structure; A and B are individually amino group or hydroxyl group; s, t, u and w are an integer of 0 to 5; and a and b are an integer of 0 to 2 with a proviso that $s+t+u+w \geq 2$)

The mixture of diastereomers can be manufactured by the following methods.

(1) A method of forming the mixture at the step of introducing chiral portions into a dichroic dye molecule in the process of synthesizing the dichroic dye.

(2) A method of forming the mixture by mixing dichroic dye molecules after separately synthesizing the individual dichroic dye molecule.

First of all, the method of (1) will be explained in detail with reference to the compound represented by the aforementioned formula (27).

The compound represented by the aforementioned formula (27) can be obtained, as shown in the following synthesizing rout, by subjecting 1,5-dichloroanthraquinone (Formula a) to a substitution reaction with a couple of thiophenol derivatives (Formula b) and (Formula c). Each of these thiophenol derivatives is a racemic compound having an asymmetric center at the para position thereof. These thiophenol derivatives are allowed to concurrently react with this 1,5-dichloroanthraquinone (Formula a).

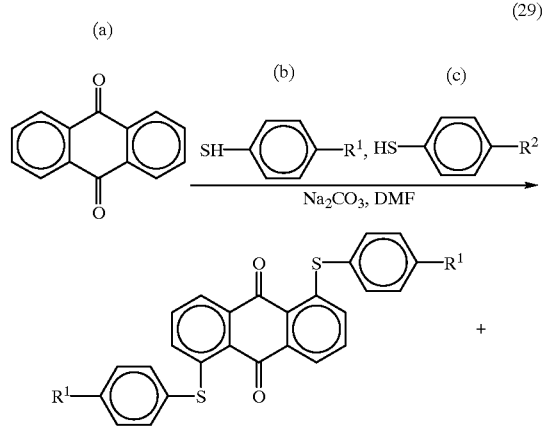

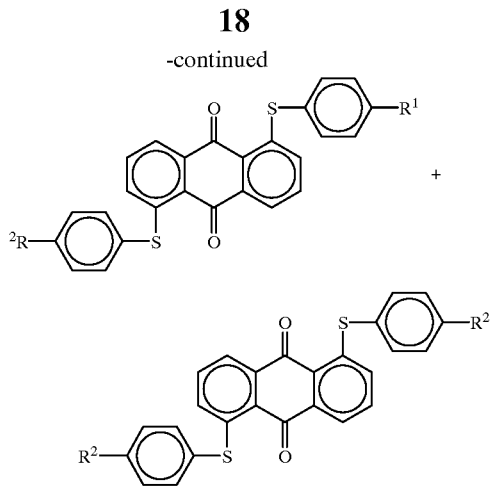

As a result, the thiophenols of the formulas (Formula b) and (Formula c) are optionally introduced into the position 1 and position 5 of the anthraquinone skeleton. Namely, the resultant product may be a mixture of the following compounds.

(1) A compound substituted with only the thiophenol derivative of Formula b.

(2) A compound substituted with only the thiophenol derivative of Formula c.

(3) A compound substituted with both thiophenol derivatives of Formula b and Formula c.

Figure 7:
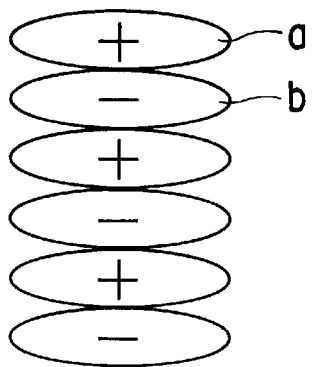
FIG. 7 is a schematic view illustrating the crystal structure of a dichroic dye mixture of a type which exhibits an increased solubility by an optical resolution.

Since these dye compounds constituting the mixture are not formed into a crystal with each other, the solubility of the mixture as a whole to a liquid crystal material can be prominently improved as compared with that of individual dye compound. Any diastereomer which is poor, as a single body, in solubility may be separated by dissolving the mixture in a solvent and then by filtering the resultant solution. There is a possibility of enhancing the solubility of this mixture to a liquid crystal by making use of an optical resolution. Namely, when the crystal of a compound having a asymmetric center or asymmetric structure is provided with a property where an enantiomer 1 and another enantiomer 2 can be arrayed alternately as shown in FIG. 7, it can be formulated to have only one of the enantiomers, i.e. only the enantiomer 1 or the enantiomer 2 by making use of an optical resolution, thereby making it possible to prominently improving the solubility thereof to a liquid crystal. This technique is also applicable to a compound having a single asymmetric center or asymmetric structure portion.

As explained above, it is possible according the fourth embodiment of this invention to improve the solubility of the dichroic dye to a liquid crystal material by introducing a plurality of asymmetric sources into the molecule of dichroic dye so as to produce a mixture of diastereomers. As a result, it is possible to obtain a clear color display in a liquid crystal display device of guest-host mode. Furthermore, it is also possible to improve the solubility of the dichroic dye to a liquid crystal material by subjecting the dichroic dye to an optical resolution so as to allow only one of the enantiomers to be existed in the dichroic dye, thereby obtaining a clear color display in a liquid crystal display device of guest-host mode.

The features of the dichroic dye as illustrated in aforementioned embodiments 1 to 4 may be combined with each other to obtain an excellent effect.

Followings are various examples of this invention and comparative examples 6 to 8.

EXAMPLE 1

2,6-dichloroanthraquinone and 2,4-bis(4-methoxyphenyl)-1,3-dithia-2,4-diphosphethane-2,4-disulfide represented by the following formula (30) were dissolved in toluene which had been dehydrated by means of distillation for instance, and the resultant solution was heated with stirring at a temperature of 110° C. in a nitrogen gas stream for 20 hours. Then, the reaction solution was treated and purified using a column to obtain a compound represented by the following formula (31).

Then, the compound represented by the following formula (31) was dehydrated by means of distillation for instance, and the resultant solution was allowed to react with thiophenol represented by the following formula (32) in a nitrogen gas stream. The resultant reaction solution was treated and purified using a column to obtain a dichroic dye represented by the formula (8).

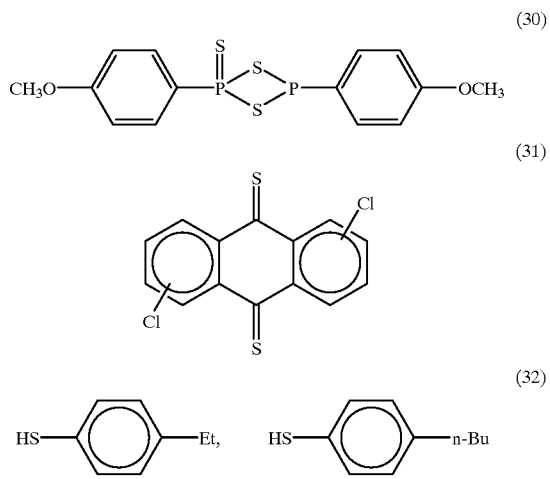

The dye represented by the formula (8) was mixed with a liquid crystal material: LIXON4033-000XX (trade name: a product from Chisso Kagaku Kogyo Co.) and the supernatant liquid was collected at each temperature of −5° C., 10° C. and 20° C. after confirming a residual of precipitated material in a sufficient amount in the mixed solution. The supernatant liquid thus collected was filtered and analyzed by means of spectrophotometry to measure the solubility of the dye at each temperature of −5° C., 10° C. and 20° C. The results are shown in FIG. 1.

As seen from FIG. 1, it was possible to obtain a color liquid crystal which was minimal in temperature dependency of solubility, free from generating any precipitation of dye even at a low temperature and excellent in solubility of dye.

EXAMPLE 2

The coumarin dye represented by the aforementioned formula (11) and 2,4-bis(4-methoxyphenyl)-1,3-dithia-2,4-diphosphethane-2,4-disulfide represented by the following formula (30) were dissolved in toluene which had been dehydrated by means of distillation for instance, and the resultant solution was heated with stirring at a temperature of 110° C. in a nitrogen gas stream for 20 hours. Then, the reaction solution was treated and purified using a column to obtain a compound represented by the aforementioned formula (25).

Then, the dichroic dye represented by the formula (10) derived from this compound represented by the formula (25) was mixed with a liquid crystal material: LIXON4033-000XX (trade name: a product from Chisso Kagaku Kogyo Co.) and the supernatant liquid was collected at each temperature of −5° C., 10° C. and 20° C. after confirming a residual of precipitated material in a sufficient amount in the mixed solution. The supernatant liquid thus collected was filtered and analyzed by means of spectrophotometry to measure the solubility of the dye at each temperature of −5° C., 10° C. and 20° C. The results are shown in FIG. 2.

As seen from FIG. 2, it was possible to obtain a color liquid crystal which was minimal in temperature dependency of solubility, free from generating any precipitation of dye even at a low temperature and excellent in solubility of dye.

EXAMPLE 3

The perylene dye represented by the aforementioned formula (13) and 2,4-bis(4-methoxyphenyl)-1,3-dithia-2,4-diphosphethane-2,4-disulfide represented by the following formula (30) were dissolved in toluene which had been dehydrated by means of distillation for instance, and the resultant solution was heated with stirring at a temperature of 180° C. in a nitrogen gas stream for 20 hours. Then, the reaction solution was treated and purified using a column to obtain a compound represented by the aforementioned formula (12).

Then, the dichroic dye represented by the formula (12) was mixed with a liquid crystal material: LIXON4033-000XX (trade name: a product from Chisso Kagaku Kogyo Co.) and the supernatant liquid was collected at each temperature of −5° C., 10° C. and 20° C. after confirming a residual of precipitated material in a sufficient amount in the mixed solution. The supernatant liquid thus collected was filtered and analyzed by means of spectrophotometry to measure the solubility of the dye at each temperature of −5° C., 10° C. and 20° C. The results are shown in FIG. 3.

As seen from FIG. 3, it was possible to obtain a color liquid crystal which was minimal in temperature dependency of solubility, free from generating any precipitation of dye even at a low temperature and excellent in solubility of dye.

Comparative Example 1

The anthraquinone dichroic dye compound represented by the aforementioned formula (9) was mixed with a liquid crystal material: LIXON4033-000XX (trade name: a product from Chisso Kagaku Kogyo Co.) and the supernatant liquid was collected at each temperature of −5° C., 10° C. and 20° C. after confirming a residual of precipitated material in a sufficient amount in the mixed solution. The supernatant liquid thus collected was filtered and analyzed by means of spectrophotometry to measure the solubility of the dye at each temperature of −5° C., 10° C. and 20° C. The results are shown in FIG. 1.

As seen from FIG. 1, the anthraquinone dichroic dye compound represented by the aforementioned formula (9) was found as being inferior in solubility and dissolution stability of dye as compared with the sulfur-substituted dichroic dye represented by the aforementioned formula (8).

Comparative Example 2

The coumarin dichroic dye compound represented by the aforementioned formula (11) was mixed with a liquid crystal material: LIXON4033-000XX (trade name: a product from Chisso Kagaku Kogyo Co.) and the supernatant liquid was collected at each temperature of −5° C., 10° C. and 20° C. after confirming a residual of precipitated material in a sufficient amount in the mixed solution. The supernatant liquid thus collected was filtered and analyzed by means of spectrophotometry to measure the solubility of the dye at each temperature of −5° C., 10° C. and 20° C. The results are shown in FIG. 2.

As seen from FIG. 2, the coumarin dichroic dye compound represented by the aforementioned formula (11) was found as being inferior in solubility and dissolution stability of dye as compared with the sulfur-substituted dichroic dye represented by the aforementioned formula (10).

Comparative Example 3

The perylene dichroic dye compound represented by the aforementioned formula (13) was mixed with a liquid crystal material: LIXON4033-000XX (trade name: a product from Chisso Kagaku Kogyo Co.) and the supernatant liquid was collected at each temperature of −5° C., 10° C. and 20° C. after confirming a residual of precipitated material in a sufficient amount in the mixed solution. The supernatant liquid thus collected was filtered and analyzed by means of spectrophotometry to measure the solubility of the dye at each temperature of −5° C., 10° C. and 20° C. The results are shown in FIG. 3.

As seen from FIG. 3, the perylene dichroic dye compound represented by the aforementioned formula (13) was found as being inferior in solubility and dissolution stability of dye as compared with the sulfur-substituted dichroic dye represented by the aforementioned formula (12).

EXAMPLE 4

The anthraquinone dichroic dye compound represented by the following formula (33) was mixed with a liquid crystal material: LIXON4033-000XX (trade name: a product from Chisso Kagaku Kogyo Co.) and the supernatant liquid was collected at each temperature of −5° C., 10° C. and 20° C. after confirming a residual of precipitated material in a sufficient amount in the mixed solution. The supernatant liquid thus collected was filtered and analyzed by means of spectrophotometry to measure the solubility of the dye at each temperature of −5° C., 10° C. and 20° C. The results are shown in FIG. 8.

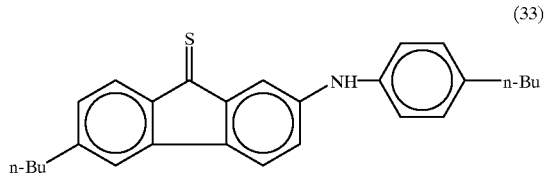
(33)

Figure 8:
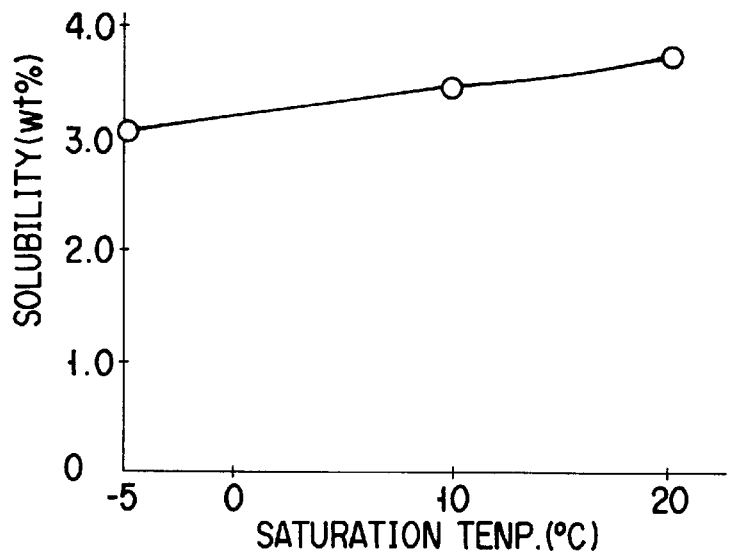
FIG. 8 is a graph showing a relationship between the saturation temperature and solubility of a dichroic dye mixture of Example 4.

As seen from FIG. 8, the dichroic dye compound obtained in this example was found as being superior in solubility and dissolution stability of dye.

EXAMPLE 5

3,9-perylene carboxylic acid which is a proton donative compound and represented by the formula (34), and a pyridine derivative which is a proton acceptive compound and represented by the formula (35) were dissolved in a liquid crystal: TC-4368XX (a product from Merk Co.).

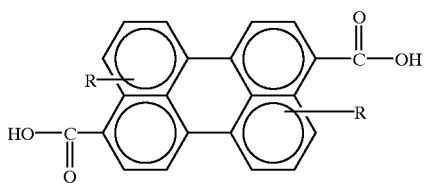
(34)

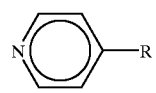
(35)

wherein R represents an alkyl group such as n-butyl, i-butyl and t-butyl; an alkoxy group; a phenyl group; a substituted phenyl group; or halogen atom.

The hydrogen bond type compound (this example) comprising a mixture of 3,9-perylene carboxylic acid represented by the formula (34) and a pyridine derivative represented by the formula (35); an ester compound obtained by directly esterifying the 3,9-perylene carboxylic acid represented by the formula (34); and a single body of 3,9-perylene carboxylic acid represented by the formula (34) were respectively dissolved in a liquid crystal, and then the saturation concentrations at room temperature of these sample compounds were measured by means of spectrophotometry, the results being shown in the following Table 1.

TABLE 1

| Dye | Solubility (wt %) | Dichroic ratio | Degree of orientation order |
|---|---|---|---|
| (34) + (35) Hydrogen bond type | 2.5 | 11.1 | 0.77 |
| Alkyl ester of (34) | 0.9 | 4.24 | 0.52 |
| (34) | ≦0.1 | 3.00 | 0.40 |
| (36) + (35) Hydrogen bond | 3.0 | 8.52 | 0.71 |
| Alkyl ester of (36) | 1.0 | 5.02 | 0.57 |
| (36) | ≦0.1 | 2.52 | 0.34 |

It will be seen from Table 1 that the solubility of hydrogen bond type compound of this example was found to be 2.5 wt %. On the other hand, the solubility of the ester compound obtained by directly esterifying the compound represented by the formula (34) was 0.9 wt %, and the single body of the compound represented by the following formula (36) was 0.1 wt % or less. These results indicate a prominent improvement in solubility of the compound of this example.

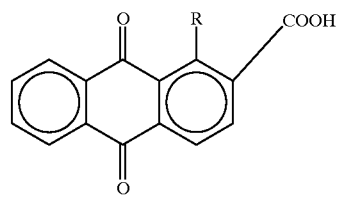
(36)

wherein R represents an alkyl group; an alkoxy group; a phenyl group; a substituted phenyl group; halogen atom; or amine.

Then, a chiral agent (S811, Merk Co.) was dissolved in this dye-containing liquid crystal, and the resultant liquid crystal material was introduced into a cell between a pair of substrates 4 and 5 provided on their surfaces with electrodes 6 and 7 respectively (10 μm in cell thickness and 240° in twist angle) to obtain a liquid crystal display device as shown in FIG. 4.

Figure 9:
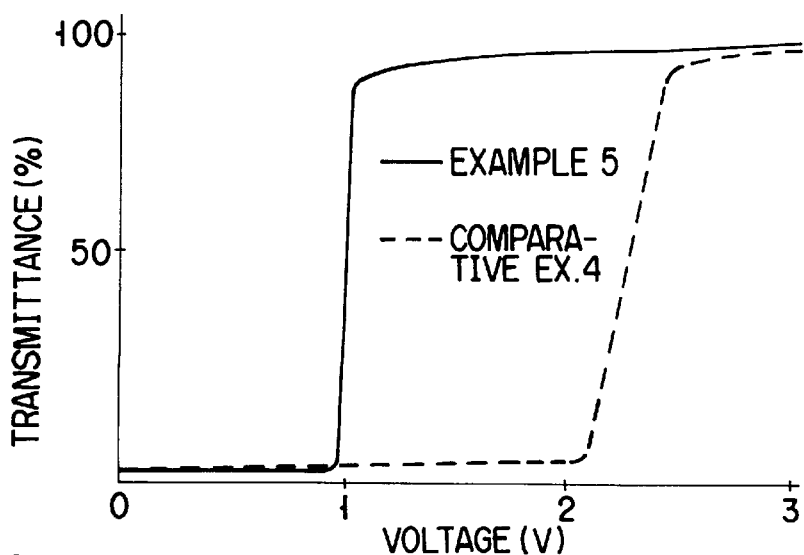
FIG. 9 is a graph showing an electrooptical properties of a liquid crystal display device of Example 5 and of Comparative Example 4.

FIG. 9 shows the transmittance of light of 460 nm in relative to the voltage applied to this liquid crystal display device. As a comparative example 4, 3,9-perylene carboxylic diisobutyl ester was dissolved in TC-4368XX, and then introduced into a cell between a pair of substrates under the same conditions as explained above. The transmittance of this comparative example 4 is also shown in FIG. 9.

It was found as a result of this experiment that the liquid crystal display device of hydrogen bonding guest-host mode according to this invention was capable of reducing the threshold voltage and exhibited a V-T property which was excellent in sharpness as compared with the liquid crystal display device employing 3,9-perylene carboxylic diisobutyl ester.

Furthermore, the dye-containing liquid crystal according to this example was introduced into a cell (10 μm in cell thickness) of parallel orientation, and the transmittance in the direction which was horizontal or perpendicular to the orientational direction of the substrates was measured thereby to determine the dichroic ratio and the degree of orientational order of the liquid crystal. The results obtained by using 3,9-perylene carboxylic diisobutyl ester and by using only the compound represented by the formula (34) are also shown in Table 1. As seen from Table 1, the liquid crystal of this example indicated a value of 11.1 in dichroic ratio and 0.77 in degree of orientational order, thus indicating a prominent improvement over the conventional liquid crystal.

As explained above, this example illustrates a comparison in solubility between a liquid crystal where anthraquinone carboxylic acid (formula (34)) was employed as a proton donative compound (hydrogen bond donor) together with 4-phenyl pyridine (formula (35)) employed as a hydrogen bond acceptor and a liquid crystal where only the anthraquinone carboxylic acid (formula (34)) was employed, the results being shown in Table 1.

Table 1 also shows the solubility of an anthraquinone carboxylic acid (formula (34)) which had been ethyl-esterified (alkyl ester).

As shown in Table 1, the solubility of anthraquinone carboxylic acid was improved by about 30 times (when the liquid crystal is of a fluorine type) by dissolving it together with 4-phenyl pyridine (formula (35)) as compared with that when the anthraquinone carboxylic acid (formula (34)) was employed singly. On the other hand, the solubility of the ethyl-esterified anthraquinone carboxylic acid (formula (34)) was improved by about 10 times.

Table 1 also shows the degree of orientational order of each of the aforementioned three kinds of the liquid crystal. As seen from Table 1, it was found out that the degree of orientational order of dichroic dye could be also improved by linking a proton donative compound with a proton acceptive compound via a hydrogen bond as proposed by this invention. This effect may be ascribed to the fact that since this hydrogen bond is a linear linkage, the apparent molecular length of the resultant dichroic dye compound is enlarged.

According to this invention, both proton donative compound (hydrogen bond donor) and proton acceptive compound (hydrogen bond acceptor) are simply dissolved in a liquid crystal so as to link these compounds with each other via a hydrogen bond, so that, in contrast to the method of enlarging the length of molecule through an ester bonding, any special synthesizing step such as esterification is not required, thus simplifying the manufacture and saving the manufacturing cost.

EXAMPLE 6

Figure 10:
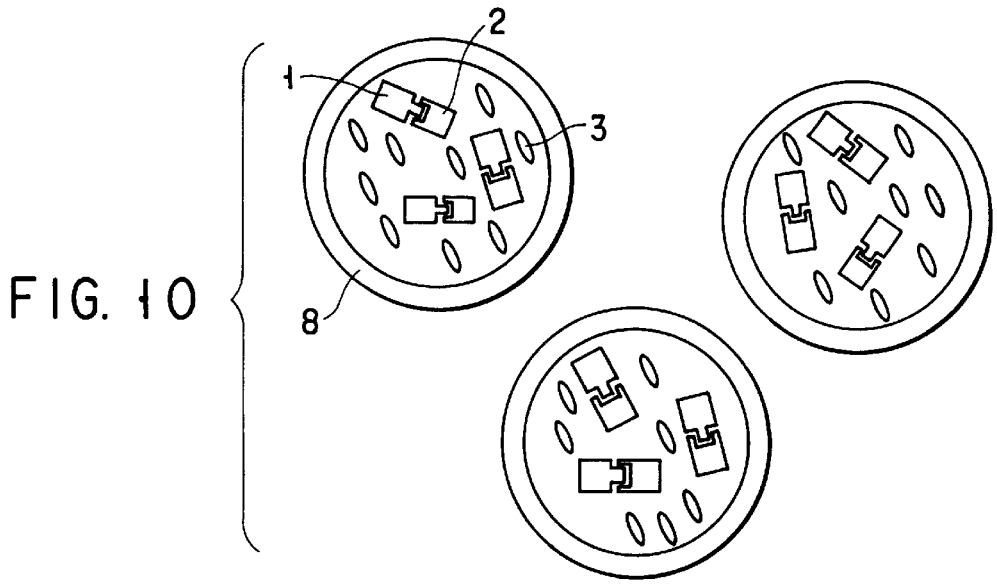
FIG. 10 is a schematic view illustrating the structure of a liquid crystal microcapsule of a liquid crystal display device according to a second embodiment of this invention.

3,9-perylene carboxylic acid (formula (34)) which was employed as a proton donative compound in Example 1 and a pyridine derivative (formula (35)) which was employed as a proton acceptive compound in Example 1 were dissolved in a liquid crystal material: TC-4368XX (a product from Merk Co.) to prepare a dye-containing liquid crystal material as shown in FIG. 10.

Then, this dye-containing liquid crystal material was encapsulated in a liquid crystal microcapsule 8 having an average particle diameter of 10 μm. As a method of forming the microcapsule, a soap-free polymerization method was employed, and the agitation speed of the reaction solution as well as polymerization speed were adjusted so as to obtain a microcapsule having an average particle diameter of 10 μm.

Figure 11:
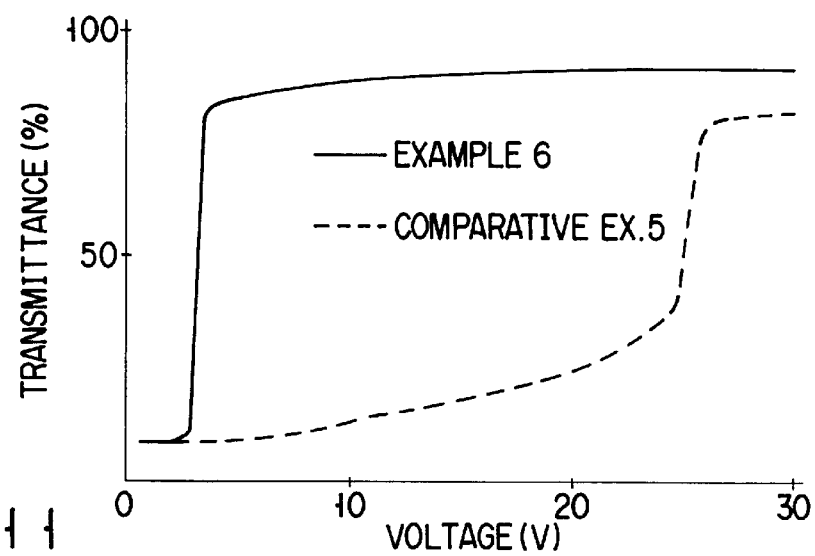
FIG. 11 is a graph showing an electrooptical properties of a liquid crystal display device of Example 6 and of Comparative Example 5.

The liquid crystal microcapsule thus obtained was printed on the surface of an ITO-mounted glass substrate thereby to prepare a liquid display device of this example. Then, an electric voltage was gradually impressed on this liquid display device and the transmittance of light of 460 nm in relative to the voltage applied was measured. The results are shown in FIG. 11. The threshold voltage of the liquid display device according to this example was found to be about 3V. The sharpness of V-T property was found dependent on the particle size distribution of the liquid crystal microcapsule, and the sharpness thereof was increased with a decrease in half value width of the particle size distribution.

As a comparative example 5, 3,9-perylene carboxylic diisobutyl ester was dissolved in TC-4368XX (Merk Co.), and then a liquid microcapsule was prepared under the same conditions as explained in this example. The property of the cell prepared by making use of the liquid microcapsule of this comparative example 5 is also shown in FIG. 11.

It was found as a result of this experiment that the liquid crystal display device of hydrogen bonding guest-host mode according to this example was capable of prominently reducing the threshold voltage as compared with the conventional liquid crystal display device employing 3,9-perylene carboxylic diisobutyl ester.

According to this example, both proton donative compound and proton acceptive compound are simply dissolved in a liquid crystal, and the resultant liquid crystal is then microcapsulated to use it as a light-controlling layer.

As shown in FIG. 10, both proton donative compound 1 (hydrogen bond donor) and proton acceptive compound 2 (hydrogen bond acceptor), at least one of which constituting a dye exhibiting an absorption in the visible light range, are dissolved in the liquid crystal 3 enclosed by a polymer wall 8 of the microcapsule, and these compounds 1 and 2 are linked via a hydrogen bond.

The liquid crystal material of guest-host mode according to this invention is low in visco-elasticity as compared with the conventional liquid crystal material where a dichroic dye is simply dissolved therein, so that the threshold voltage can be extremely minimized.

The conventional liquid crystal display device where a microcapsulated liquid crystal material is formed on a substrate has been known to be high in threshold voltage, because of its many restrictions on the interface, as compared with the liquid crystal display device where a liquid crystal material is simply interposed between a pair of transparent electrode-bearing substrates. However, it is possible according to this invention to extremely reduce this threshold voltage.

EXAMPLE 7

An anthraquinone dye having a carboxyl group which is a proton donative compound and represented by the formula (36), and a pyridine derivative which is a proton acceptive compound and represented by the formula (35) were dissolved in a liquid crystal: TC-4368XX (a product from Merk Co.) to obtain a dye-containing liquid crystal material, which was then studied in the same manner as explained in Example 5.

When the saturation concentration at room temperature of the dye-containing liquid crystal material was measured by means of spectrophotometry, the concentration thereof was found as being 3.0 wt % as shown in the aforementioned Table 1.

On the other hand, a dye which was obtained by directly esterifying the compound represented by the formula (36) was dissolved in the same liquid crystal material as employed in this example, and then the saturation concentration of the resultant liquid crystal material was measured, finding it as being 1.0 wt %. It will be seen from these results that the liquid crystal material according to this example was capable of exhibiting more prominent improvement in solubility over the liquid crystal material which was prepared by a direct esterification. On the other hand, the liquid crystal material which was prepared by dissolving the compound represented by the formula (36) in the liquid crystal indicated a saturation concentration of 0.1 wt % or less.

Figure 12:
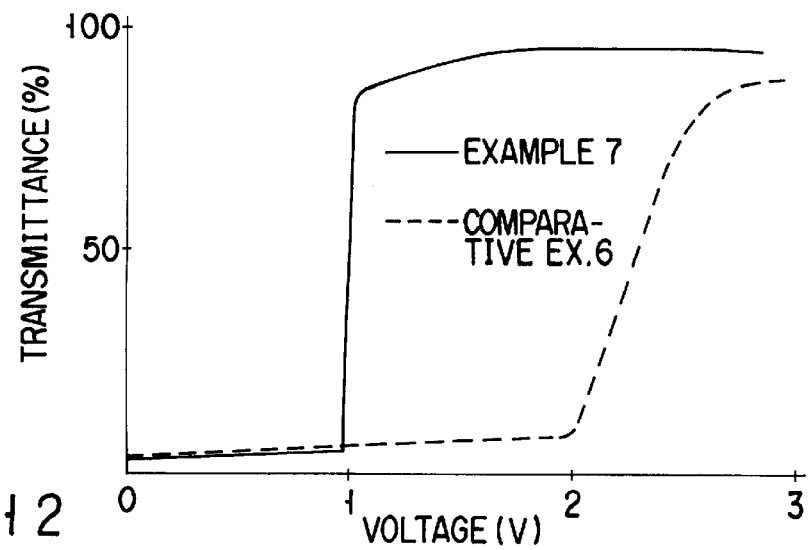
FIG. 12 is a graph showing an electrooptical properties of a liquid crystal display device of Example 7 and of Comparative Example 6.

Then, the dye-containing liquid crystal of this example was introduced into a cell as shown in FIG. 4 to obtain a liquid crystal display device, and the electrooptical property of the resultant liquid crystal display device was measured, the results being shown in FIG. 12. As a comparative example 6, an alkyl ester of anthraquinone dye having a carboxyl group was dissolved in a liquid crystal material: TC-4368XX (Merk Co.), and then introduced into a cell under the same conditions as explained in this example. The electrooptical property of the resultant cell measured is also shown in FIG. 12.

It was found as a result of this experiment that the liquid crystal display device according to this invention was capable of reducing the threshold voltage and exhibited a V-T property which was excellent in sharpness as compared with the liquid crystal display device of Comparative Example 6.

Furthermore, the dye-containing liquid crystal according to this example was introduced into a cell (10 µm in cell thickness) of parallel orientation, and the transmittance in the direction which was horizontal or perpendicular to the orientational direction of the substrates was measured thereby to determine the dichroic ratio and the degree of orientational order of the liquid crystal. The results obtained by using the alkyl ester of anthraquinone dye having a carboxyl group and by using only the compound represented by the formula (36) are also shown in Table 1. As seen from Table 1, the liquid crystal of this example indicated a value of 8.52 in dichroic ratio and 0.71 in degree of orientational order, thus indicating a prominent improvement over the conventional liquid crystal.

EXAMPLE 8

Anthraquinone dye having a carboxyl group (formula (36)) which was employed as a proton donative compound in Example 4 and a pyridine derivative (formula (34)) which was employed as a proton acceptive compound in Example 4 were dissolved in a liquid crystal material: TC-4368XX (a product from Merk Co.) to prepare a dye-containing liquid crystal material.

Then, this dye-containing liquid crystal material was encapsulated in a liquid crystal microcapsule having an average particle diameter of 10 µm. As a method of forming the microcapsule, a soaply polymerization method was employed, and the agitation speed of the reaction solution as well as polymerization speed were adjusted so as to obtain a microcapsule having an average particle diameter of 10 µm.

The liquid crystal microcapsule thus obtained was printed on the surface of an ITO-mounted glass substrate thereby to prepare a liquid display device of this example. Then, an electric voltage was gradually impressed on this liquid display device and the transmittance of light of 460 nm in relative to the voltage applied was measured. The results are shown in FIG. 13. The threshold voltage of the liquid display device according to this example was found to be about 3V. The sharpness of V-T property was found dependent on the particle size distribution of the liquid crystal microcapsule, and the sharpness thereof was increased with a decrease in half value width of the particle size distribution.

As a comparative example 7, an alkyl ester of anthraquinone dye having a carboxyl group was dissolved in TC-4368XX (Merk Co.), and then a liquid microcapsule was prepared under the same conditions as explained in this example. The property of the cell prepared by making use of the liquid microcapsule of this comparative example 7 is also shown in FIG. 13.

It was found as a result of this experiment that the liquid crystal display device according to this example was capable of prominently reducing the threshold voltage as compared with the comparative example 7.

EXAMPLE 9

An anthraquinone dye having a carboxyl group which is a proton donative compound and represented by the formula (37), and a compound having a pyridine skeleton which is a proton acceptive compound and represented by the formula (38) were dissolved simultaneously in a liquid crystal: TC-4368XX (a product from Merk Co.) to obtain a dye-containing liquid crystal material.

Then, a chiral agent (S811, Merk Co.) was dissolved in this dye-containing liquid crystal, and the resultant liquid crystal material was introduced into a cell between a pair of substrates 4 and 5 provided on their surfaces with electrodes 6 and 7 respectively (10 µm in cell thickness and 240° in twist angle) to obtain a liquid crystal display device as shown in FIG. 4. This liquid crystal cell indicated black in color when no electric voltage was impressed thereon, but indicated an increase in luminous reflectance as electric voltage was impressed thereon as shown in FIG. 14.

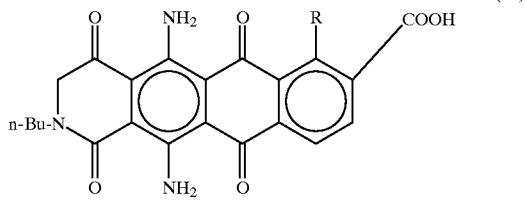

(37)

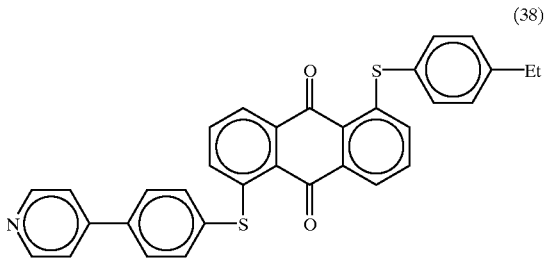

(38)

EXAMPLE 10

An anthraquinone dye having a carboxyl group which is a proton donative compound and represented by the formula (38), and a compound having a pyridine skeleton which is a proton acceptive compound and represented by the formula (39) were dissolved simultaneously in a liquid crystal: TC-4368XX (a product from Merk Co.) to obtain a dye-containing liquid crystal material.

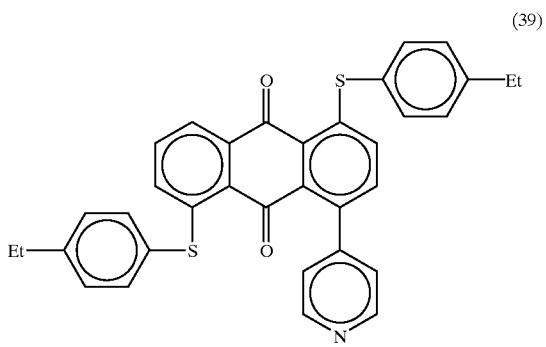

(39)

Then, a chiral agent (S811, Merk Co.) was dissolved in this dye-containing liquid crystal, and the resultant liquid crystal material was introduced into a cell between a pair of substrates 4 and 5 provided on their surfaces with electrodes 6 and 7 respectively (10 μm in cell thickness and 240° in twist angle) to obtain a liquid crystal display device as shown in FIG. 4. This liquid crystal cell indicated blue in color when no electric voltage was impressed thereon, but indicated a change in color from blue to yellow (from A to B and to C) as electric voltage was impressed thereon as indicated in FIG. 15.

EXAMPLE 11

1.02 g (3.68 mmol) of 1,5-dichloroanthraquinone was dissolved in 20 ml of dimethyl formamide, and heated at a temperature of 80° C. in a nitrogen gas atmosphere. Then, a far excessive quantity of four kinds of thiophenol derivatives as shown in the following formulas (40) and twice as much equivalent weight of sodium carbonate as that of 1,5-dichloroanthraquinone were simultaneously added to the reaction mixture. After being stirred for 3 hours, the resultant reaction mixture was allowed to stand still overnight at room temperature. The reaction mixture was then suction-filtered to remove the precipitates, the filtrate of which being subsequently washed with dimethyl formamide and then with water. The filtrate was then refined by making use of a wet column to obtain a dichroic dye mixture represented by the following formulas (24). The yield of the product was 90%.

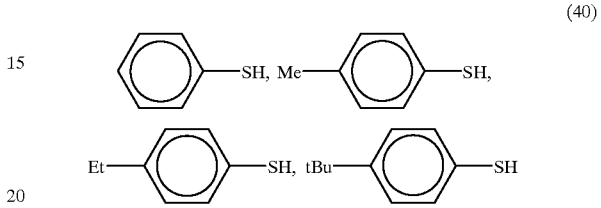

(40)

The yellow dye thus obtained was mixed with a liquid crystal material: LIXON4033-000XX (trade name: a product from Chisso Kagaku Kogyo Co.) and the supernatant liquid was collected at each temperature of –5° C., 10° C. and 20° C. after confirming a residual of precipitated material in a sufficient amount in the mixed solution. The supernatant liquid thus collected was filtered and analyzed by means of spectrophotometry to measure the solubility of the dye at each temperature of –5° C., 10° C. and 20° C. As a result, the dichroic dye mixture obtained in this example was found minimal in temperature dependency of solubility and free from generating any precipitation of dye even at a low temperature.

FIG. 16 shows a spectral transmittance of the liquid crystal solution containing the dye mixture thus obtained.

EXAMPLE 12

The procedures of Example 11 were repeated except that 1,4,5,8-tetrachloroanthraquinone was substituted for 1,5-dichloroanthraquinone of Example 11 so as to react it with the compounds shown in the following formulas (40), thereby obtaining a magenta dichroic dye represented by the following formula (41). The yield of the product was 80%.

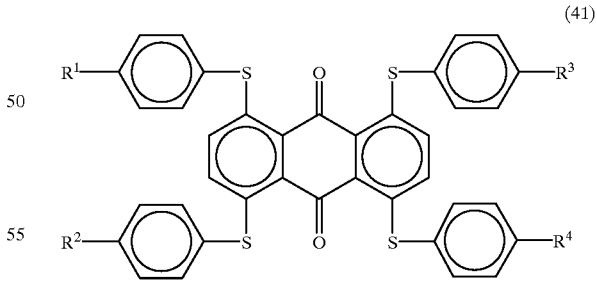

(41)

(wherein $R^1$, $R^2$, $R^3$ and $R^4$ are individually H, methyl, ethyl or t-butyl).

The solubility of the dye thus obtained was measured in the same manner as explained in Example 11 to obtain a result shown in FIG. 17. It can be understood from FIG. 17 that the dichroic dye mixture obtained in this example was found minimal in temperature dependency of solubility and free from generating any precipitation of dye even at a low temperature. The solubility of the dye of this example indicated a larger solubility as compared with the dye of Example 11. This can be ascribed to the fact that the number in kinds of dichroic dyes constituting the dye mixture was larger in this example as compared with that of Example 11.

FIG. 18 shows a spectral transmittance of the liquid crystal solution containing the dye mixture thus obtained.

EXAMPLE 13

The procedures of Example 11 were repeated by making use of 1,5-dichloroanthraquinone and allowing it to react with two kinds of thiophenol-substituted compound shown in the following formulas (42), thereby obtaining a magenta dichroic dye represented by the following formula (43). The yield of the product was 80%.

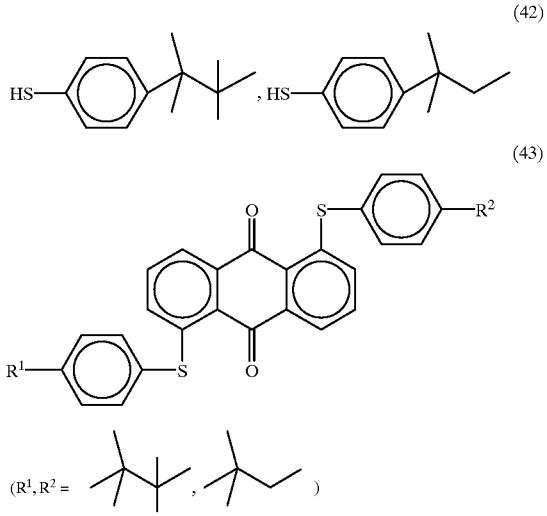

As a result, it was possible to obtain a color liquid crystal which was minimal in temperature dependency of solubility and free from generating any precipitation of dye even at a low temperature.

Comparative Example 8

The solubility of a magenta dichroic dye having a flexible portion at its substituent group, which is shown in the aforementioned formula (25) (n=3), was measured in the same manner as in Examples 11 and 12, the result being shown in FIG. 6. As seen from FIG. 6, although the solubility of this dichroic dye is large at a temperature of 20° C., the solubility of this dichroic dye is very small at lower temperatures. When this color liquid crystal was introduced into a cell having a cell thickness of 10 μm and allowed to stand still for 150 hours at a temperature of −5° C., the precipitation of needle-like crystal was admitted.

EXAMPLE 14

1.02 g (3.68 mmol) of 1,5-dichloroanthraquinone was dissolved in 20 ml of dimethyl formamide, and heated at a temperature of 80° C. in a nitrogen gas atmosphere. Then, an excessive quantity of two kinds of thiophenol derivatives as shown in the following formulas (44) and (45) and twice as much equivalent weight of sodium carbonate as that of 1,5-dichloroanthraquinone were simultaneously added to the reaction mixture. After being stirred for 3 hours, the resultant reaction mixture was allowed to stand still overnight at room temperature.

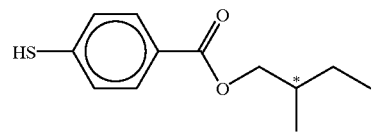

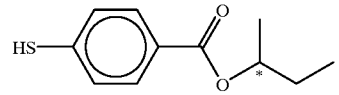

The reaction mixture was then suction-filtered to remove the precipitates consisting mainly of sodium chloride but also including a little amount of color molecules poor in solubility. The filtrate was then concentrated by means of evaporation, and an excessive quantity of thiophenol was removed by making use of a wet column.

The yellow dye mixture thus obtained was mixed with a liquid crystal material: LIXON4033-000XX (trade name: a product from Chisso Kagaku Kogyo Co.) at room temperature and the resultant mixture was allowed to stand still for three months. Then, the supernatant liquid was collected after confirming a residual of precipitated material in a sufficient amount in the mixed solution. The supernatant liquid thus collected was analyzed by means of spectrophotometry to measure the solubility of the dye, finding it as being 4.3 wt %.

EXAMPLE 15

The procedures of Example 14 were repeated except that 1,4,5,8-tetrachloroanthraquinone was substituted for 1,5-dichloroanthraquinone of Example 14, thereby obtaining a magenta dichroic dye represented. The solubility of the dye thus obtained was found as being 4.0 wt %. The solubility of the dye of this example indicated a larger solubility as compared with the dye of Example 14, presumably because of the fact that the number in kinds of diastereomer constituting the dye mixture was larger in this example as compared with that of Example 14.

EXAMPLE 16

1,5-dichloroanthraquinone was employed and the aniline derivatives represented by the following formulas (46) and (47) were substituted for the thiophenol derivatives employed in Example 14. Almost the same synthesizing method as that of Example 14 was employed in this example, but since the reactivity was poor in this reaction mixture as compared with Example 14, a catalyst was employed and the reaction was performed at a temperature of 170° C. for 10 hours.

The solubility of the magenta dye mixture thus obtained was found 4.5 wt %.

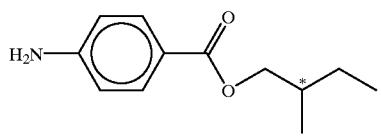

(46)

(47)

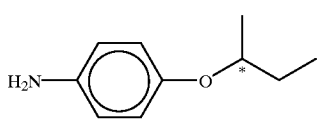

EXAMPLE 17

1,5-dichloroanthraquinone was employed, into which the aniline derivative represented by the following formula (48) was introduced. The same synthesizing method as that of Example 16 was employed in this example. The dye thus obtained was recrystallized thereby to perform an optical resolution. The solubility of the resultant dye at room temperature was found 3.9 wt %. It was found from the comparison of the result of this example with the results of Comparative Example 12 to be hereinafter explained that it was possible to improve the solubility of dye by performing an optical resolution.

(48)

Comparative Example 9

1,5-dichloroanthraquinone was employed, into which 4-n-butylthiophenol and 4-ethylthiophenol were introduced in the same manner as employed in Example 14, thus obtaining a yellow dye mixture. The solubility of the resultant dye mixture at room temperature was found 0.5 wt %. Namely, the solubility of this dye mixture was very low as compared with the dye mixture obtained in Example 14.

Comparative Example 10

1,4,5,8-tetrachloroanthraquinone was employed, into which 4-n-butylthiophenol and 4-ethylthiophenol were introduced in the same manner as employed in Example 14, thus obtaining a magenta dye mixture. The solubility of the resultant dye mixture at room temperature was found 0.9 wt %. Namely, the solubility of this dye mixture was very low as compared with the dye mixture obtained in Example 15.

Comparative Example 11

1,5-dichloroanthraquinone was employed, into which 4-n-butylaniline and 4-ethylaniline were introduced in the same manner as employed in Example 16, thus obtaining a magenta dye mixture. The solubility of the resultant dye mixture at room temperature was found 0.6 wt %. Namely, the solubility of this dye mixture was very low as compared with the dye mixture obtained in Example 16.

Comparative Example 12

1,5-dichloroanthraquinone was employed, into which an aniline derivative represented by the formula (48) was introduced in the same manner as employed in Example 16. The solubility of the resultant dye at room temperature was found 0.2 wt %. Namely, the solubility of this dye was very low as compared with the dye mixture obtained in Example 14.

EXAMPLE 18

A dye mixture comprising a thiocarbonyl group and substituent groups which were all rigid in nature as represented by the formula (49) was mixed with a liquid crystal material: LIXON4033-000XX (trade name: a product from Chisso Kagaku Kogyo Co.) and the supernatant liquid was collected at each temperature of −5° C., 10° C. and 20° C. after confirming a residual of precipitated material in a sufficient amount in the mixed solution. The supernatant liquid thus collected was filtered and analyzed by means of spectrophotometry to measure the solubility of the dye at each temperature of −5° C., 10° C. and 20° C., the results being illustrated in FIG. 19.

(49)

(wherein $R^1$ and $R^2$ are individually ethyl or t-butyl).

As seen from FIG. 19, the dichroic dye mixture according to this example was found excellent in solubility and dissolution stability as compared with the case where the dye was provided with only one of these features. This excellent result can be attributed to a synergistic effect of the facts that this dichroic dye mixture comprised thiocarbonyl group and that the substituent groups were all rigid in nature.

When the retention of a color liquid crystal having this dichroic dye mixture dissolved therein was measured by exposing it to an irradiation of sun light of 100,000 lux, it indicated 98.5% at 50° C.

EXAMPLE 19

A dye mixture comprising a thiocarbonyl group, a plurality of chiral centers and substituent groups which were all rigid in nature as represented by the formula (50) was mixed with a liquid crystal material: LIXON4033-000XX (trade name: a product from Chisso Kagaku Kogyo Co.) and the supernatant liquid was collected at each temperature of −5° C., 10° C. and 20° C. after confirming a residual of precipitated material in a sufficient amount in the mixed solution. The supernatant liquid thus collected was filtered and analyzed by means of spectrophotometry to measure the solubility of the dye at each temperature of −5° C., 10° C. and 20° C., the results being illustrated in FIG. 19.

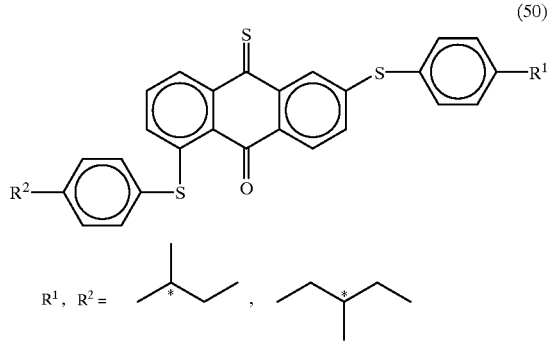

(50)

As seen from FIG. 19, the dichroic dye mixture according to this example was found excellent in solubility and dissolution stability as compared with the case where the dye was provided with only one of these features. This excellent result can be attributed to a synergistic effect of the facts that this dichroic dye mixture comprised thiocarbonyl group, that this dichroic dye mixture was provided with a plurality of chiral centers, and that the substituent groups were all rigid in nature.

When the retention of a color liquid crystal having this dichroic dye mixture dissolved therein was measured by exposing it to an irradiation of sun light of 100,000 lux, it indicated 98.3% at 50° C.

Followings are explanations on a fifth embodiment of this invention.

As explained above, in order to obtain a bright display in a color display device of reflective type, the display device should preferably be of a type which can be dispensed with a color filter or a polarization plate. On the other hand, a display device of 3-ply type is complicated in structure so that it is not suited for a mass production. With a view to solve this problem, a method has been proposed wherein a liquid crystal is microcapsulated with a polymer and the resultant microcapsule is coated on a substrate by means of printing, the resultant substrate being laminated with another substrate. However, it has been found that the liquid microcapsule is high in threshold voltage, thus increasing the consumption of electric power.

Therefore, the fifth embodiment of this invention is aimed at reducing the threshold voltage in a liquid crystal microcapsule so as to minimize the power consumption in a reflective type display device. Additionally, the fifth embodiment of this invention is also aimed at reducing the threshold voltage even in a liquid crystal cell which does not employ a liquid microcapsule so as to realize a low power driving of the conventional ordinary display device.

The present inventors have found after intensive study that if a dichroic dye molecule having anthraquinone as a basic skeleton to which a tolan (diphenyl acetylene) skeleton or a difluorostilbene skeleton has been introduced as a substituent group is dissolved in a liquid crystal, the threshold voltage of the liquid crystal can be prominently reduced and, on the basis of this finding, have accomplished this invention.

Namely, one example of the dichroic dye molecule according to the fifth embodiment of this invention is an anthraquinone dichroic dye represented by the following general formula (51).

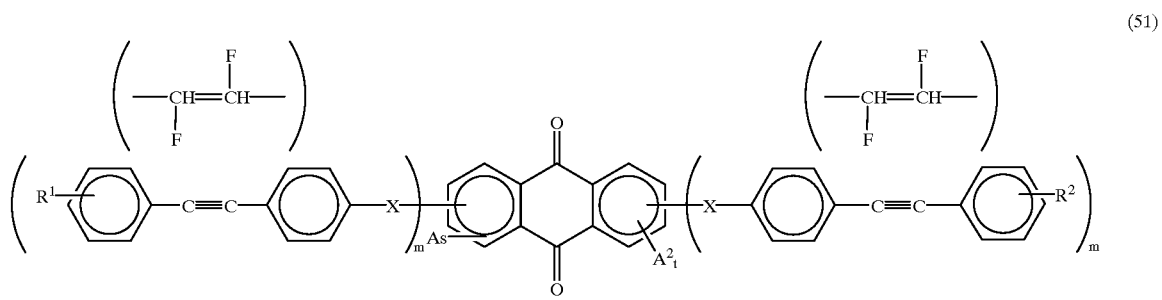

(51)

(wherein X is O, S, —CH$_2$—, —NH—, —N(Me), —S—CH$_2$— or —O—CH$_2$—; A$^1$ and A$^2$ are individually H, NH$_2$ or NO$_2$; R$^1$ and R$^2$ are individually nitro group or alkyl group; m, n, s and t are an integer of 0 to 4 with a proviso that they cannot take 0 simultaneously and that m+s≦4; and n+t≦4)

It is possible to introduce an alkyl group such as methyl, ethyl, n-propyl, iso-propyl, n-butyl or t-butyl; or an electron attractive substituent group such as nitro group into a terminal portion of the tolan.

Since the tolan skeleton is excellent in linearity, when tolan is introduced as a substituent group into a dye molecule, the dichroic ratio thereof can be improved, thereby enhancing the contrast of a display device and making it possible to obtain a clear color display. When an electron attractive substituent group such as nitro group is introduced into a terminal of tolan, the dielectric anisotropy of tolan can be enhanced, thereby making it possible to decrease the threshold voltage and saturation voltage of a liquid crystal as a whole and hence to realize a low power consumption driving.

Examples of dichroic dye according to the fifth embodiment of this invention include a coumarin dye represented by the following formula (52) and a perylene dye represented by the following formula (53). Any of these dyes are effective in improving the dichroic ratio and threshold voltage of a liquid crystal.

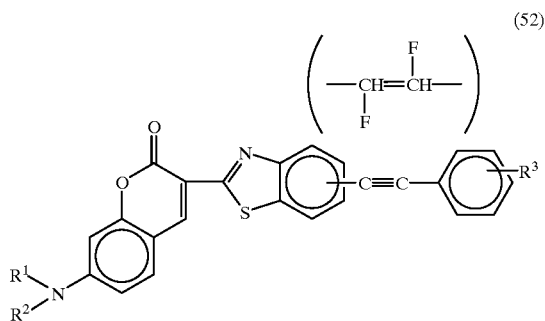

(52)

(wherein $R^1$ and $R^2$ are individually nitro group or alkyl group)

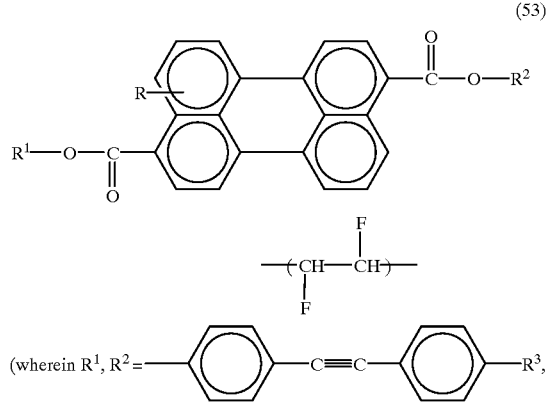

(53)

(wherein $R^1$, $R^2$ = or alkyl group, $R^3$ = alkyl group or nitrogroup, with a proviso that at least one of $R^1$ and $R^2$ has a tolan skeleton)

The dichroic dye according to the fifth embodiment of this invention is effective in decreasing the threshold voltage and saturation voltage of an ordinary liquid crystal cell. However, the effects of decreasing the threshold voltage and saturation voltage can be more prominently manifested in a liquid crystal microcapsule or in a high molecular distributed liquid crystal cell where these threshold voltage and saturation voltage become an important issue.

The fifth embodiment of this invention is related to a guest-host mode display device wherein tolan (diphenylacetylene) substituent group is introduced into a dye such as anthraquinone dye, coumarin dye or perylene dye. With the introduction of tolan or difluorostilbene, the dielectric anisotropy of a dichroic dye or a color liquid crystal material can be enhanced so that it becomes possible to decrease the threshold voltage and saturation voltage of a liquid crystal cell and hence to realize a low power consumption driving. Moreover, with the introduction of tolan, the degree of orientational order of dichroic dye can be enhanced, thus promoting the contrast of display device and making it possible to obtain a clear display.

EXAMPLE 20

An anthraquinone dichroic dye compound represented by the formula (54) was dissolved in a liquid crystal: TC-4368XX (a product from Merk Co.) at a concentration of 1 wt % to obtain a color liquid crystal. This color liquid crystal was then introduced into an STN cell (10 μm in cell thickness and 240° in twist angle) and measured of its threshold voltage, finding it as being 1.5V (tolan, difluorobenzophenone). Then, a liquid crystal microcapsule having an average particle diameter of 10 μm was manufactured using this color liquid crystal.

The liquid crystal microcapsule thus obtained was coated by means of printing for instance on the surface of an ITO-mounted glass substrate, and then the resultant ITO-mounted glass substrate was hermetically (without leaving any space therebetween) superimposed with another ITO-mounted glass substrate thereby to prepare a liquid crystal cell. The threshold voltage and saturation voltage of this cell were found 1.7V and 15V respectively. The degree of orientational order (S) of the cell was 0.78. On the other hand, in the case of difluorobenzophenone, the threshold voltage, saturation voltage and degree of orientational order of the cell were 1.7V, 15V and 0.75 respectively.

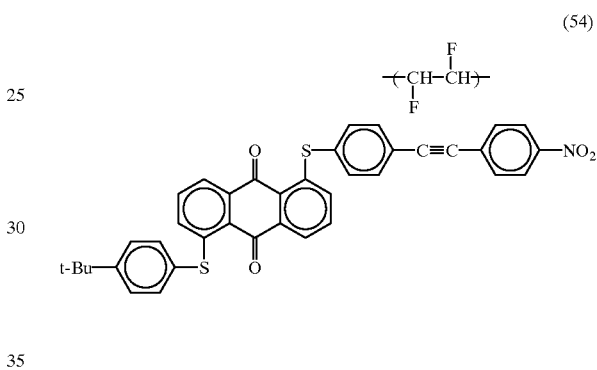

(54)

EXAMPLE 21

The same procedures as mentioned in Example 20 were repeated except that a coumarin dichroic dye compound represented by the formula (55) was substituted for the anthraquinone dichroic dye compound and the concentration thereof was set to 0.2 wt %, thereby to manufacture an STN cell. The threshold voltage of the cell was 1.4V (tolan, difluorobenzophenone). Then, the color liquid crystal thus obtained was employed to prepare a liquid crystal cell in the same manner as in Example 20. The threshold voltage and saturation voltage of this cell were found 1.6V and 13V respectively in both tolan and difluorobenzophenone.

These results illustrate that the concentration of dye in this example was less than that in Example 20. This can be ascribed to the fact that the coumarin dye of this example is larger in absorbancy index as compared with the anthraquinone dye of Example 20 so that a sufficiently clear color display required can be achieved with a lesser concentration of the dye in this example. When a dye is dissolved in a liquid crystal, the visco-elasticity of the liquid crystal is generally increased, thus increasing the threshold voltage thereof. In view of this fact, the employment of a dye having a higher absorbancy index as in this example is advantageous. As a matter of fact, the threshold voltage and saturation voltage of the cell of this example were smaller than those of Example 20. The degree of orientational order (S) of the cell was 0.70 in the case of tolan, and 0.66 in the case of difluorobenzophenone.

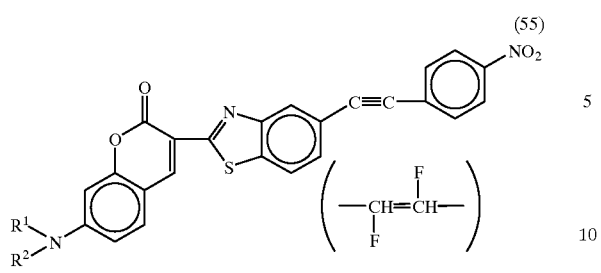

(55)

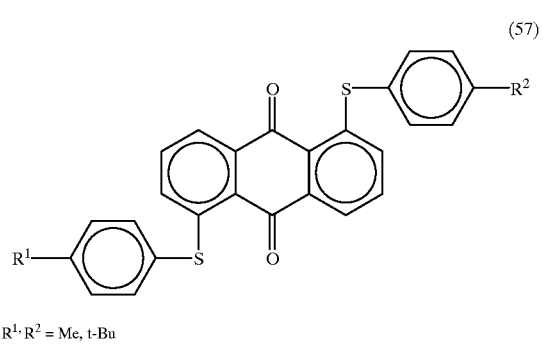

$R^{1,} R^2$ = Me, t-Bu

Comparative Example 14

The same procedures as mentioned in Example 21 were repeated except that a coumarin dichroic dye compound represented by the formula (58) was substituted for the dichroic dye compound of Example 21, thereby to manufacture an STN cell. The threshold voltage of the cell was 1.8V. Then, a cell of liquid crystal microcapsule was prepared in the same manner as in Example 21. The threshold voltage and saturation voltage of this cell were found 2.3V and 19V respectively.

EXAMPLE 22

The same procedures as mentioned in Example 20 were repeated except that a perylene dichroic dye compound represented by the formula (56) was substituted for the anthraquinone dichroic dye compound and the concentration thereof was set to 0.8 wt %, thereby to manufacture an STN cell. The threshold voltage of the cell was 1.6V (tolan, difluorobenzophenone). Then, the color liquid crystal thus obtained was employed to prepare a liquid crystal cell in the same manner as in Example 20. The threshold voltage and saturation voltage of this cell were found 1.8V and 16V respectively in both tolan and difluorobenzophenone.

These results illustrate that the threshold voltage and saturation voltage of dye in this example were somewhat larger than those in Example 20. This can be ascribed to the fact that the perylene dye of this example gives a larger visco-elasticity effect to a liquid crystal as compared with other kinds of dye. The degree of orientational order (S) of the cell was 0.70 in the case of tolan, and 0.67 in the case of difluorobenzophenone.

The degree of orientational order (S) of the cell was 0.76.

(56)

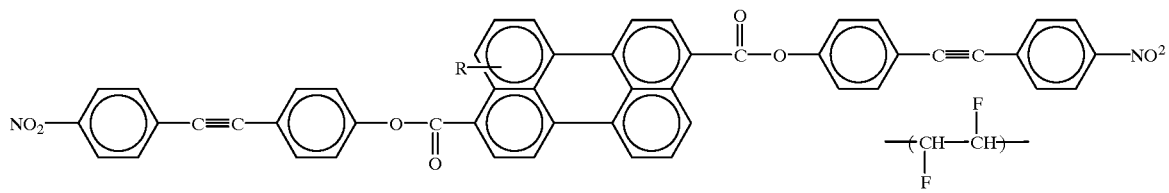

The degree of orientational order (S) of the cell was 0.61.

(58)

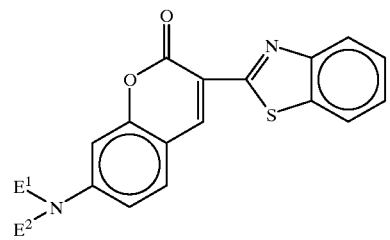

Comparative Example 13

The same procedures as mentioned in Example 20 were repeated except that an anthraquinone dichroic dye compound represented by the formula (57) was substituted for the dichroic dye compound of Example 20, thereby to manufacture an STN cell. The threshold voltage of the cell was 1.9V. Then, a cell of liquid crystal microcapsule was prepared in the same manner as in Example 20. The threshold voltage and saturation voltage of this cell were found 2.5V and 20V respectively.

Comparative Example 15

The same procedures as mentioned in Example 22 were repeated except that a coumarin dichroic dye compound represented by the formula (59) was substituted for the dichroic dye compound of Example 22, thereby to manufacture an STN cell. The threshold voltage of the cell was 2.0V. Then, a liquid crystal microcapsule was prepared in the same manner as in Example 22. The threshold voltage and saturation voltage of this liquid crystal microcapsule were found 2.7V and 22V respectively. The degree of orientational order (S) of the cell was 0.51.

(59)

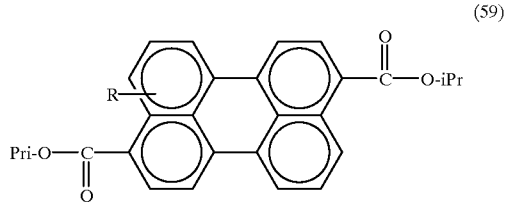

EXAMPLE 23

The coumarin dye represented by the following formula (60) and 2,4-bis(4-methoxyphenyl)-1,3-dithia-2,4-diphosphethane-2,4-disulfide represented by the following formula (30) were dissolved in toluene which had been dehydrated by means of distillation for instance, and the resultant solution was heated with stirring at a temperature of 110° C. in a nitrogen gas stream for 2 hours. Then, the reaction solution was treated and purified using a column to obtain a compound represented by the following formula (61).

(60)

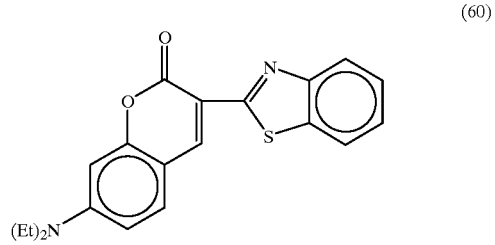

(61)

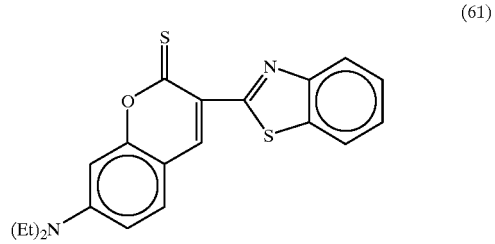

Then, the dichroic dye represented by the formula (61) was mixed with a liquid crystal material: LIXON4033-000XX (trade name: a product from Chisso Kagaku Kogyo Co.) and the supernatant liquid was mixed solution. The supernatant liquid thus collected was filtered and analyzed by means of spectrophotometry to measure the solubility of the dye. The results are shown in the following Table 2.

Comparative Example 16

The solubility of the dye represented by the aforementioned formula (60) at each temperature of −5° C. and 24° C. is measured. The results are shown in the following Table 2.

TABLE 2

| Dye | Solubility | |
| --- | --- | --- |
| | 24° C. | −5° C. |
| (60) | 0.28 | 0.02 |
| (61) | 0.45 | 0.44 |

As seen from Table 2, the dichroic dye, in which the oxygen atom of carbonyl group of Coumarin dye is substituted by sulfur atom, has a solubility to a liquid crystal as compared with the dichroic dye in which the oxygen atom is not substituted by sulfure atom.

As explained above, it is possible according to the first embodiment of this invention to provide a liquid crystal display device, wherein the oxygen atom of carbonyl group or ester group of dichroic dye molecule is substituted by sulfur atom or selenium atom, thus making it possible to improve the solubility and dissolution stability thereof to a liquid crystal and to increase the electric resistance of a color liquid crystal. As a result, a liquid crystal display device exhibiting a bright and clear color display can be obtained.

It is possible according to the second embodiment of this invention to provide a liquid crystal display device, wherein a proton-donative compound and a proton-acceptive compound, at least one of which being selected to be a dye molecule exhibiting an absorption in the visible light range, are dissolved in a liquid crystal so as to link them together via a hydrogen. As a result, it is possible, due to the flexibility of hydrogen bonding, to lower the visco-elasticity of the liquid crystal material, thereby making it possible to lower the threshold voltage, to improve the electrooptical property and to accelerate the response. Furthermore, since the apparent molecular length of the dye can be enlarged due to the linearity of the hydrogen bond, it is possible to improve the dichroic ratio and the degree of orientational order of the dye molecule, and at the same time, to prominently improve the solubility of the dye to a liquid crystal.

It is possible according to the third embodiment of this invention to provide a liquid crystal display device comprising two or more kinds of dichroic dyes in high concentration, wherein all of the dichroic dyes are made entirely rigid except a linkage portion between a basic skeleton and a substituent group thereof, thereby making it possible to minimize the temperature dependency of solubility of the dyes and at the same time to prevent the precipitation of the dyes at a low temperature.

It is possible according to the fourth embodiment of this invention to provide a liquid crystal display device, wherein a plurality of asymmetric sources are introduced into the molecule of dichroic dye so as to produce a mixture of diastereomers, or this mixture of diastereomers or a diastereomer having one asymmetric source is optically resolved so as to obtain only one type of enantiomorph thereof, thereby making it possible to improve the solubility of the dichroic dye to the liquid crystal. As a result of this improvement in solubility, it is possible to obtain a liquid crystal display device which is capable of exhibiting a clear color display, reducing the power consumption and promoting the response speed thereof to an electric field.

The fifth embodiment of this invention is featured in providing a dichroic dye wherein a tolan (diphenylacetylene) moiety or difluorobenzophenone is introduced into a dye such as anthraquinone dye, coumarin dye or perylene dye. With the introduction of tolan or difluorostilbene, the dichroic ratio and dielectric anisotropy of the dichroic dye can be enhanced so that it becomes possible to improve the contrast of liquid crystal display device, to decrease the threshold voltage and saturation voltage of a liquid crystal cell and hence to realize a low power consumption driving. Most prominent effect of this fifth embodiment can be obtained when this fifth embodiment is applied to a display device using a liquid crystal microcapsule.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. A liquid crystal display device which comprises;
  a pair of substrate facing to each other and each provided with an electrode, the electrode provided on one of the substrates being faced to the electrode provided on the other substrate; and a liquid crystal layer sandwiched between said pair of substrates; wherein said liquid crystal layer contains as a main component a liquid crystal having a dichroic dye molecule dissolved therein, said dichroic dye molecule having at least one group selected from the group consisting of thiocarbonyl group, dithioester group, selenocarbonyl group, selenoester group and diselenoester group.

2. The liquid crystal display device according to claim 1, wherein said dichroic dye molecule contains a group selected from the group consisting of thiocarbonyl group and dithioester group.

3. The liquid crystal display device according to claim 1, wherein said dichroic dye molecule comprises a skeleton represented by the following general formula (1):

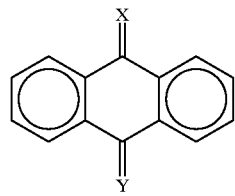

(1)

(wherein X and Y represent individually O, S or Se, with the proviso that X and Y cannot concurrently be O).

4. The liquid crystal display device according to claim 1, wherein said dichroic dye molecule comprises a skeleton represented by the following general formula (2):

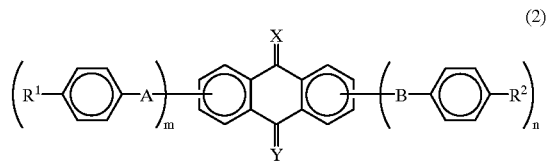

(2)

(wherein X and Y represent individually O, S or Se, with the proviso that X and Y cannot concurrently be O, $R^1$ and $R^2$ are individually H, alkyl group or cycloalkyl group; A and B are individually S or NH; and both n and m are an integer of 0 to 4).

5. The liquid crystal display device according to claim 1, wherein said dichroic dye molecule comprises a skeleton represented by the following general formula (3):

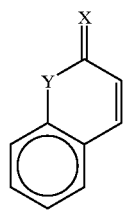

(3)

(wherein X represents O, S or Se; and Y is O, S, or Se, with a proviso that X and Y cannot concurrently be O').

6. The liquid crystal display device according to claim 1, wherein said dichroic dye molecule comprises a skeleton represented by the following general formula (4):

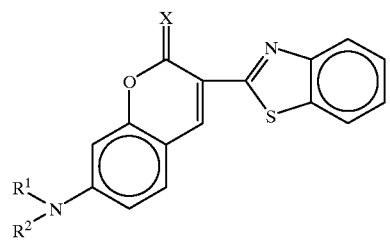

(4)

(wherein X is S or Se; and $R^1$ and $R^2$ are individually H or alkyl group).

7. The liquid crystal display device according to claim 1, wherein said dichroic dye molecule comprises a skeleton represented by the following general formula (5):

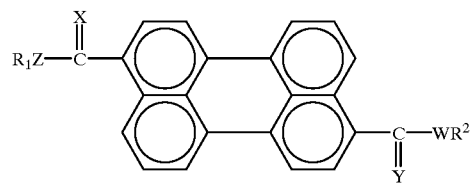

(wherein X, Y, Z and W represent individually O, S or Se, with the proviso that X, Y, Z and W cannot concurrently be O and that X and Y cannot concurrently be O; $R^1$ and $R^2$ are individually alkyl group, phenyl group, or cycloalkyl group).

8. The liquid crystal display device according to claim 1, wherein said dichroic dye molecule comprises a skeleton represented by the following general formula (6):

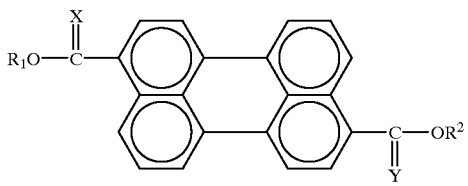

(wherein X and Y represent individually O, S or Se, with the proviso that X and Y cannot concurrently be O; $R^1$ and $R^2$ are individually alkyl group, phenyl group, or cycloalkyl group).

9. The liquid crystal display device according to claim 1, wherein said dichroic dye molecule has a skeleton represented by the following general formula (7):

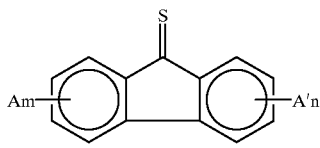

(7)

(wherein A and A' represent individually ester group, thioester group, dithioester group, aminophenyl group, amino group or nitro group; and both m and n are an integer of 0 to 4).

10. The liquid crystal display device according to claim 1, wherein said dichroic dye molecule comprises a skeleton represented by the following general formula (5):

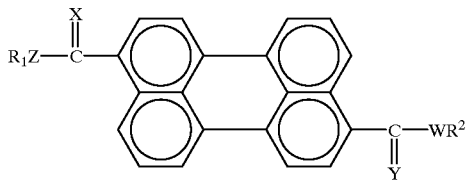

(wherein X, Y, Z and W represent individually O, S or Se, with the proviso that X, Y, Z and W cannot concurrently be O and that X and Y cannot concurrently be O; $R^1$ and $R^2$ are individually alkyl group containing 1 to 8 carbon atoms, phenyl group, or cycloalkyl group).

11. The liquid crystal display device according to claim 1, wherein said dichroic dye molecule comprises a skeleton represented by the following general formula (6):

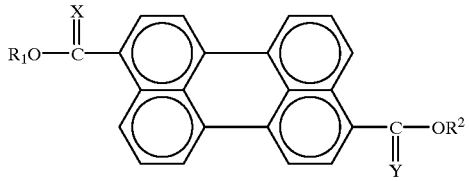

(wherein X and Y represent individually O, S or Se, with the proviso that X and Y cannot concurrently be O; $R^1$ and $R^2$ are individually alkyl group containing 1 to 8 carbon atoms, phenyl group, or cycloalkyl group).

12. The liquid crystal display device according to claim 1, wherein said dichroic dye molecule comprises a skeleton represented by the following general formula (5):

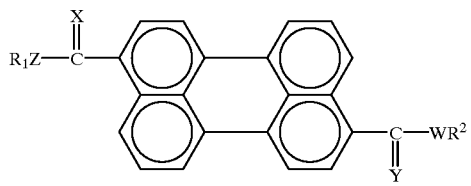

(wherein X, Y, Z and W represent individually O, S or Se, with the proviso that X, Y, Z and W cannot concurrently be O and that X and Y cannot concurrently be O; $R^1$ and $R^2$ are individually alkyl group containing 8 carbon atoms, phenyl group, or cycloalkyl group).

13. The liquid crystal display device according to claim 1, wherein said dichroic dye molecule comprises a skeleton represented by the following general formula (6):

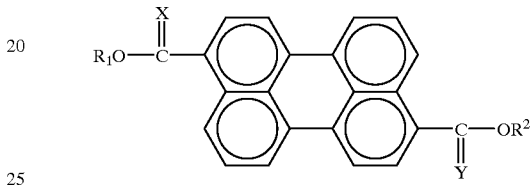

(wherein X and Y represent individually O, S or Se, with the proviso that X and Y cannot concurrently be O; $R^1$ and $R^2$ are individually alkyl group containing 8 carbon atoms, phenyl group, or cycloalkyl group).

14. A liquid crystal display device which comprises;
a pair of substrate facing to each other and each provided with an electrode, the electrode provided on one of the substrates being faced to the electrode provided on the other substrate; and a liquid crystal layer sandwiched between said pair of substrate; wherein said liquid crystal layer comprises liquid crystal composition containing a liquid crystal compound, a first compound which is proton-donative and a second compound which is proton-acceptive; said first compound being linked via a hydrogen bonding with said second compound; and at least one of said first compound and said second compound exhibiting an absorption in the visible light range.

15. The liquid crystal display device according to claim 14, wherein said liquid crystal composition is enclosed in a microcapsule whose wall is constituted by a polymer.

16. The liquid crystal display device according to claim 14, wherein said first compound is a compound having a carboxylic group and said second compound is a pyridine compound.

17. The liquid crystal display device according to claim 14, wherein said first compound and said second compound both exhibit an absorption in the visible light range and exhibit black in color as both of these compounds are superimposed or interacted with each other, a magnitude of said absorption being altered depending on a magnitude of a voltage applied thereon.

* * * * *